(12) United States Patent
Sellars et al.

(10) Patent No.: US 7,967,309 B2
(45) Date of Patent: Jun. 28, 2011

(54) VEHICULAR SWING ARM ASSEMBLIES AND VEHICLES COMPRISING AXLE PORTIONS

(75) Inventors: Daniel Thomas Sellars, West Liberty, OH (US); Prince Rodriguez, Powell, OH (US); Scott Daniel Batdorf, Raymond, OH (US)

(73) Assignee: Honda Motor Company, Ltd., Tokyo (JP)

( * ) Notice: Subject to any disclaimer, the term of this patent is extended or adjusted under 35 U.S.C. 154(b) by 458 days.

(21) Appl. No.: 12/039,261

(22) Filed: Feb. 28, 2008

(65) Prior Publication Data
US 2009/0218781 A1    Sep. 3, 2009

(51) Int. Cl.
  *B60G 3/12*   (2006.01)
  *B60G 21/055* (2006.01)
  *B60G 3/18*   (2006.01)
(52) U.S. Cl. ............. 280/124.128; 280/124.11; 180/377
(58) Field of Classification Search ........... 280/124.116, 280/124.11, 124.109, 124.128, 124.129, 280/124.13, 124.134, 124.145, 124.152, 280/124.153, 124.154, 124.156
See application file for complete search history.

(56) References Cited

U.S. PATENT DOCUMENTS

| | | | |
|---|---|---|---|
| 2,200,798 A | 5/1940 | Megow | |
| 2,476,664 A | 7/1949 | Humig | |
| 2,753,190 A * | 7/1956 | Hooven | 280/124.111 |
| 3,411,805 A | 11/1968 | Salna | |
| 4,375,293 A | 3/1983 | Solbes | |
| 4,877,102 A | 10/1989 | Stewart | |
| 4,881,752 A | 11/1989 | Tanaka | |
| 4,887,829 A | 12/1989 | Prince | |
| 5,080,389 A | 1/1992 | Kawano et al. | |
| 5,292,149 A | 3/1994 | Luger | |
| 5,332,246 A | 7/1994 | Buell | |
| 5,380,035 A | 1/1995 | Lee | |
| 5,845,918 A | 12/1998 | Grinde et al. | |
| 5,954,352 A | 9/1999 | Rumpel et al. | |
| 6,305,487 B1 | 10/2001 | Montague | |
| 6,412,796 B1 | 7/2002 | Kroniger | |
| 6,481,523 B1 | 11/2002 | Noro et al. | |
| 6,527,289 B2 | 3/2003 | Parigian | |
| 6,533,060 B1 | 3/2003 | Seto | |
| 6,581,711 B1 | 6/2003 | Tuluie | |
| 6,675,926 B2 | 1/2004 | Montague | |
| 6,719,313 B2 | 4/2004 | Zadok | |
| 6,725,957 B2 | 4/2004 | Sutton | |
| 6,746,032 B2 | 6/2004 | Seki | |
| 6,823,958 B2 | 11/2004 | Domenicali et al. | |
| 6,851,691 B2 | 2/2005 | Rasidescu et al. | |
| 6,863,289 B2 * | 3/2005 | Buhl et al. | 280/124.111 |
| 6,866,281 B2 | 3/2005 | D'Aluisio et al. | |
| 6,904,986 B2 | 6/2005 | Brazier | |
| 7,090,234 B2 | 8/2006 | Takayanagi et al. | |
| 7,434,822 B2 * | 10/2008 | Takahashi et al. | 280/124.109 |
| 7,708,106 B1 * | 5/2010 | Bergman et al. | 180/349 |
| 2001/0004149 A1 | 6/2001 | Fujiki et al. | |
| 2004/0195818 A1 | 10/2004 | Borke et al. | |
| 2004/0227321 A1 | 11/2004 | Kuroki et al. | |
| 2005/0092538 A1 | 5/2005 | Baldwin et al. | |
| 2005/0180821 A1 | 8/2005 | Wilkinson | |
| 2007/0007758 A1 * | 1/2007 | Maeda et al. | 280/788 |
| 2007/0035104 A1 | 2/2007 | Sommers | |
| 2009/0127813 A1 * | 5/2009 | Stewart | 280/124.152 |

* cited by examiner

*Primary Examiner* — Paul N Dickson
*Assistant Examiner* — Karen A Beck
(74) *Attorney, Agent, or Firm* — Ulmer & Berne LLP

(57) ABSTRACT

Left and right axle portions are provided for attachment to respective left and right wheels of a vehicle. The left axle portion can be rotatably supported by a left hub support portion, and the right axle portion can be rotatably supported by a right hub support portion. The left and right hub support portions can be movably supported with respect to the frame. Vehicles are also provided.

22 Claims, 14 Drawing Sheets

VEHICULAR SWING ARM ASSEMBLIES AND VEHICLES COMPRISING AXLE PORTIONS

TECHNICAL FIELD

Left and right axle portions are movable with respect to a vehicle's frame for attachment to left and right wheels of the vehicle.

BACKGROUND

A conventional all terrain vehicle ("ATV") includes a rear swing arm assembly which supports a rear axle. When severe terrain is encountered, the rear swing arm assembly allows the rear axle to move with respect to the ATV's frame. However, conventional swing arm assemblies often do not adequately facilitate articulation and driving of an axle.

SUMMARY

In accordance with one embodiment, a vehicular swing arm assembly comprises a swing member, a stabilizing assembly, a housing, a left axle portion, and a right axle portion. The swing member is configured for movable attachment to a frame of a vehicle such that the swing member is movable about a first axis with respect to a frame of a vehicle. The stabilizing assembly comprises a central portion, a left hub support portion, and a right hub support portion. The central portion is movably attached to the swing member such that the stabilizing assembly is movable about a second axis with respect to the swing member. The second axis resides in a plane substantially perpendicular to the first axis. The housing comprises a left receptacle portion, a right receptacle portion, and an outer drive surface. The housing is rotatably supported by the swing member and is configured to rotate about a third axis with respect to the swing member. The third axis is substantially parallel with the first axis. The outer drive surface is configured to directly contact a drive member. The left axle portion extends from the left receptacle portion to the left hub support portion. The right axle portion extends from the night receptacle portion to the right hub support portion.

In accordance with another embodiment, a vehicle comprises a frame, a swing member, a stabilizing assembly, a housing, a drive member, a left axle portion, and a right axle portion. The swing member is movably attached to the frame such that the swing member is movable about a first axis with respect to the frame. The stabilizing assembly comprises a central portion, a left hub support portion, and a right hub support portion. The central portion is movably attached to the swing member such that the stabilizing assembly is movable about a second axis with respect to the swing member. The second axis resides in a plane substantially perpendicular to the first axis. The housing comprises a left receptacle portion, a right receptacle portion, and an outer drive surface. The housing is rotatably supported by the swing member. The drive member directly contacts the outer drive surface. The left axle portion extends from the left receptacle portion to the left hub support portion. The right axle portion extends from the right receptacle portion to the right hub support portion.

In accordance with yet another embodiment, a vehicle comprises a frame, a left hub support portion, a right hub support portion, a left axle portion, and a right axle portion, a left wheel, a right wheel, a left support arm, a right support arm, a left cushion member, and a right cushion member. The right hub support portion is fixed with respect to the left hub support portion. The left axle portion is rotatably supported by the left hub support portion. The right axle portion is rotatably supported by the right hub support portion. The left wheel is attached to the left axle portion. The right wheel is attached to the right axle portion. The left support arm extends between a left outer end and a left inner end. The left outer end is movably attached to the left hub support portion. The left inner end is movably attached to the frame. The right support arm extends between a right outer end and a right inner end. The right outer end is movably attached to the right hub support portion. The right inner end is movably attached to the frame. The left cushion member comprises a left first end and a left second end. The left first end is movably attached to the frame. The left second end is movably attached to the left support arm at a position disposed along the left support arm between the left outer end and the left inner end. The right cushion member comprises a right first end and a right second end. The right first end is movably attached to the frame. The right second end is movably attached to the right support arm at a position disposed along the right support arm between the right outer end and the right inner end.

In accordance with still another embodiment, a vehicle comprises a frame, a left hub support portion, a right hub support portion, a left axle portion, a right axle portion, a left wheel, a right wheel, a left longitudinally extending riser member, a right longitudinally extending riser member, a left support arm, a right support arm, a left cushion member, and a right cushion member. The left axle portion is rotatably supported by the left hub support portion. The right axle portion is rotatably supported by the right hub support portion. The left wheel is attached to the left axle portion. The right wheel is attached to the right axle portion. The left longitudinally extending riser member extends between a left frame end and a left support end. The left frame end is movably attached to the frame. The right longitudinally extending riser member extends between a right frame end and a right support end. The right frame end is movably attached to the frame. The left support arm extends between a left outer end and a left inner end. The left outer end is movably attached to the left hub support portion. The left inner end is movably attached to the left support end of the left longitudinally extending riser member. The right support arm extends between a right outer end and a right inner end. The right outer end is movably attached to the right hub support portion. The right inner end is movably attached to the right support end of the right longitudinally extending riser member. The left cushion member comprises a left first end and a left second end. The left first end is movably attached to the frame. The left second end is movably attached to the left support arm at a position disposed along the left support arm between the left outer end and the left inner end. The right cushion member comprises a right first end and a right second end. The right first end is movably attached to the frame. The right second end is movably attached to the right support arm at a position disposed along the right support arm between the right outer end and the right inner end.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
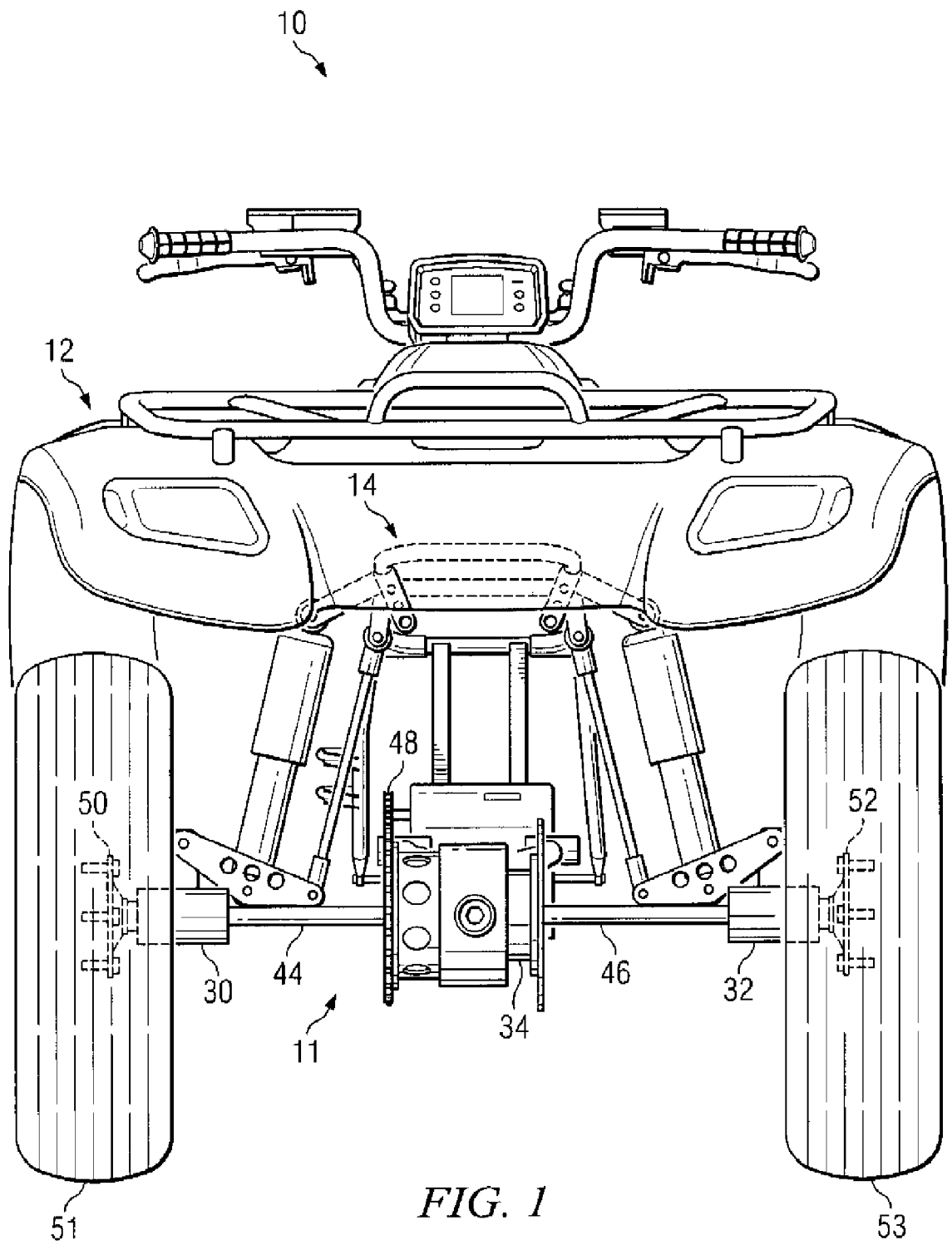
FIG. 1 is a rear elevational view depicting an ATV in accordance with one embodiment.

The present invention and its operation are hereinafter described in detail in connection with the views and examples of FIGS. 1-14, wherein like numbers indicate the same or corresponding elements throughout the views. A suspension assembly in accordance with one embodiment of the present invention can be provided upon a vehicle such as, for example, an ATV, am auto mobile, a recreational vehicle, a utility vehicle, or a toy. In one embodiment, and as depicted in FIG. 1, a suspension assembly can comprise a swing arm assembly 11 which is provided on an ATV 10. The ATV 10 can comprise a body 12 supported by a frame 14 to which a swing arm assembly 11 can be movably engaged.

Figure 4:
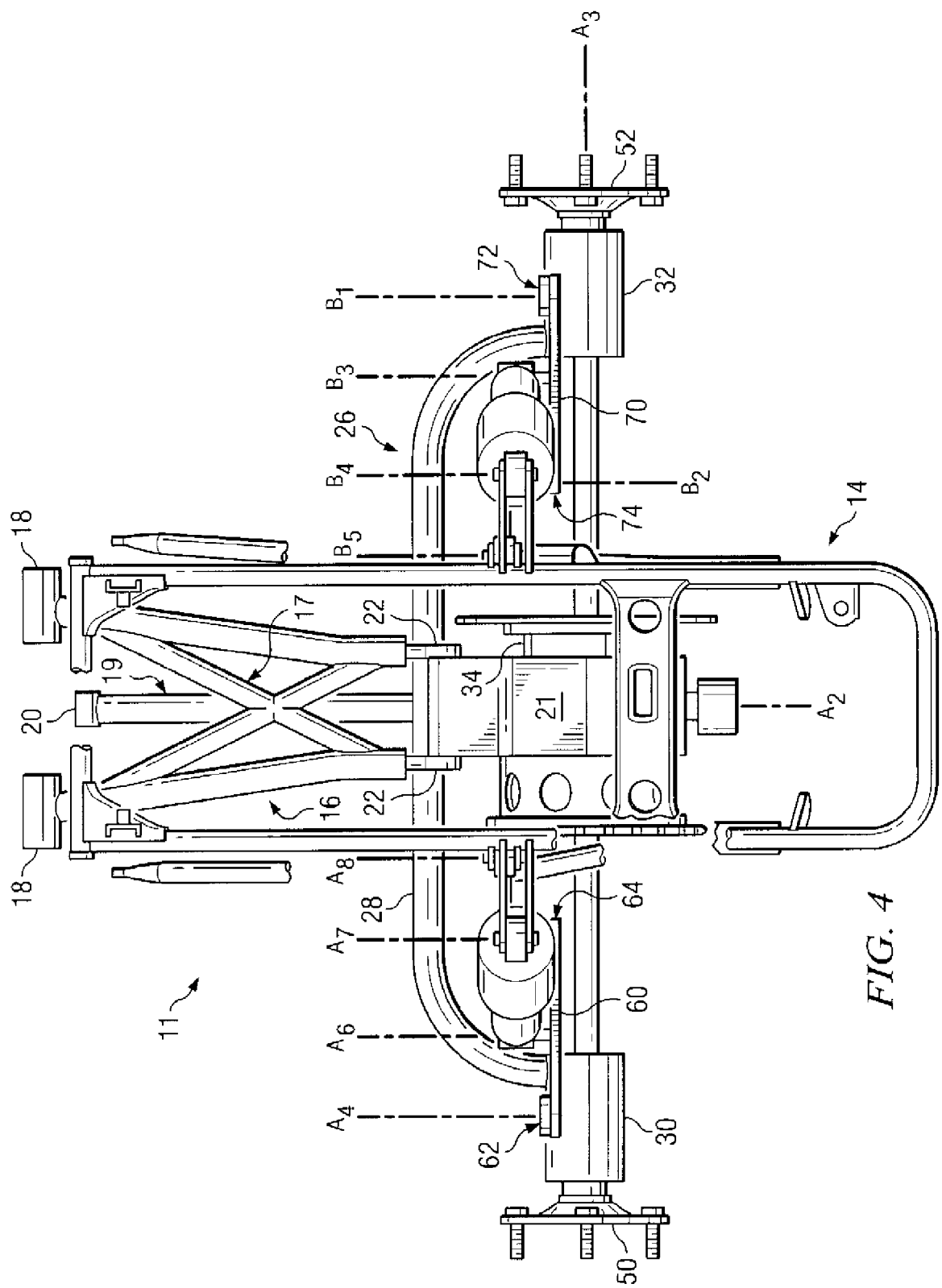
FIG. 4 is a top plan view depicting the components of FIG. 2.
Figure 5:
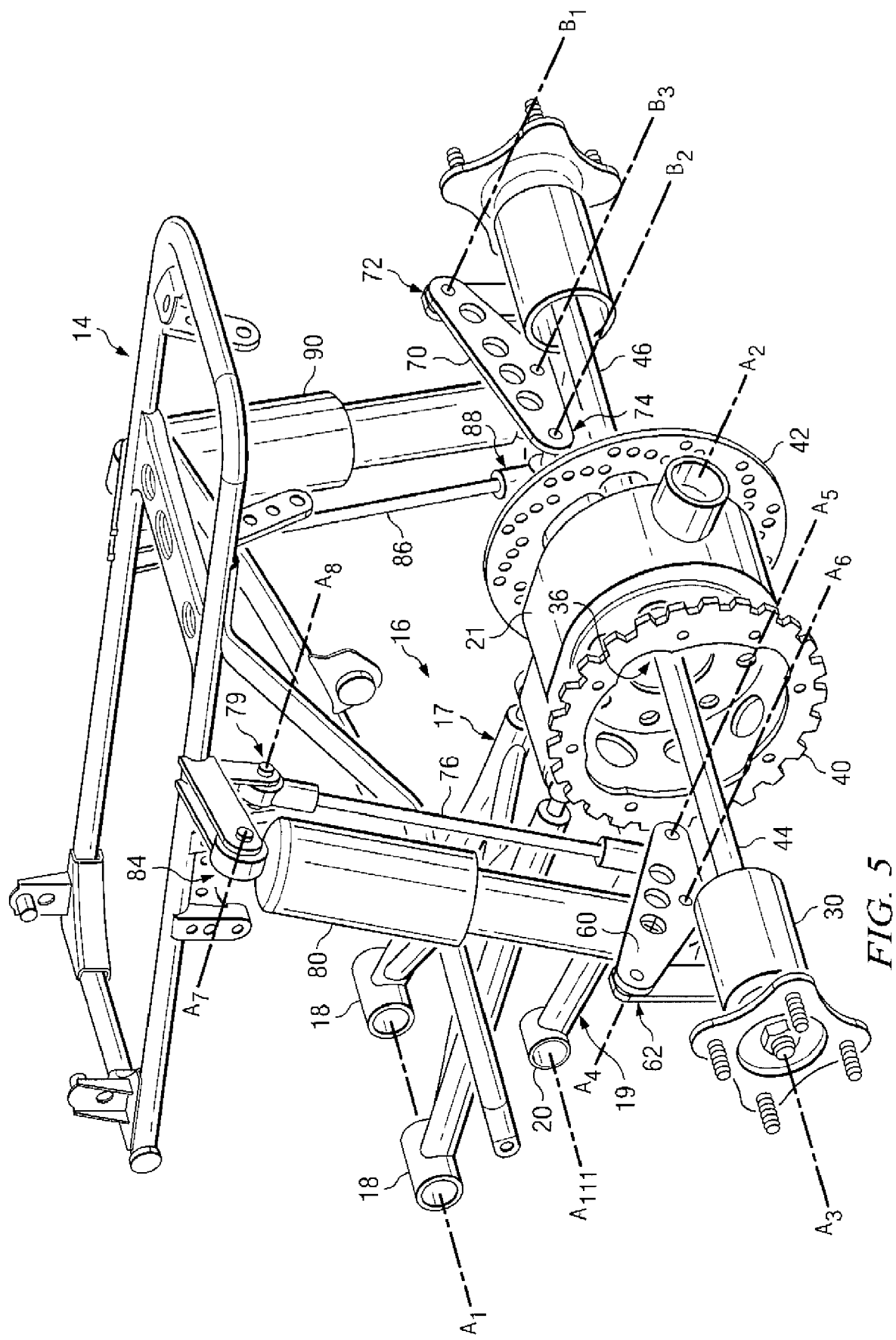
FIG. 5 is a top rear perspective view depicting the components of FIG. 2.
Figure 6:
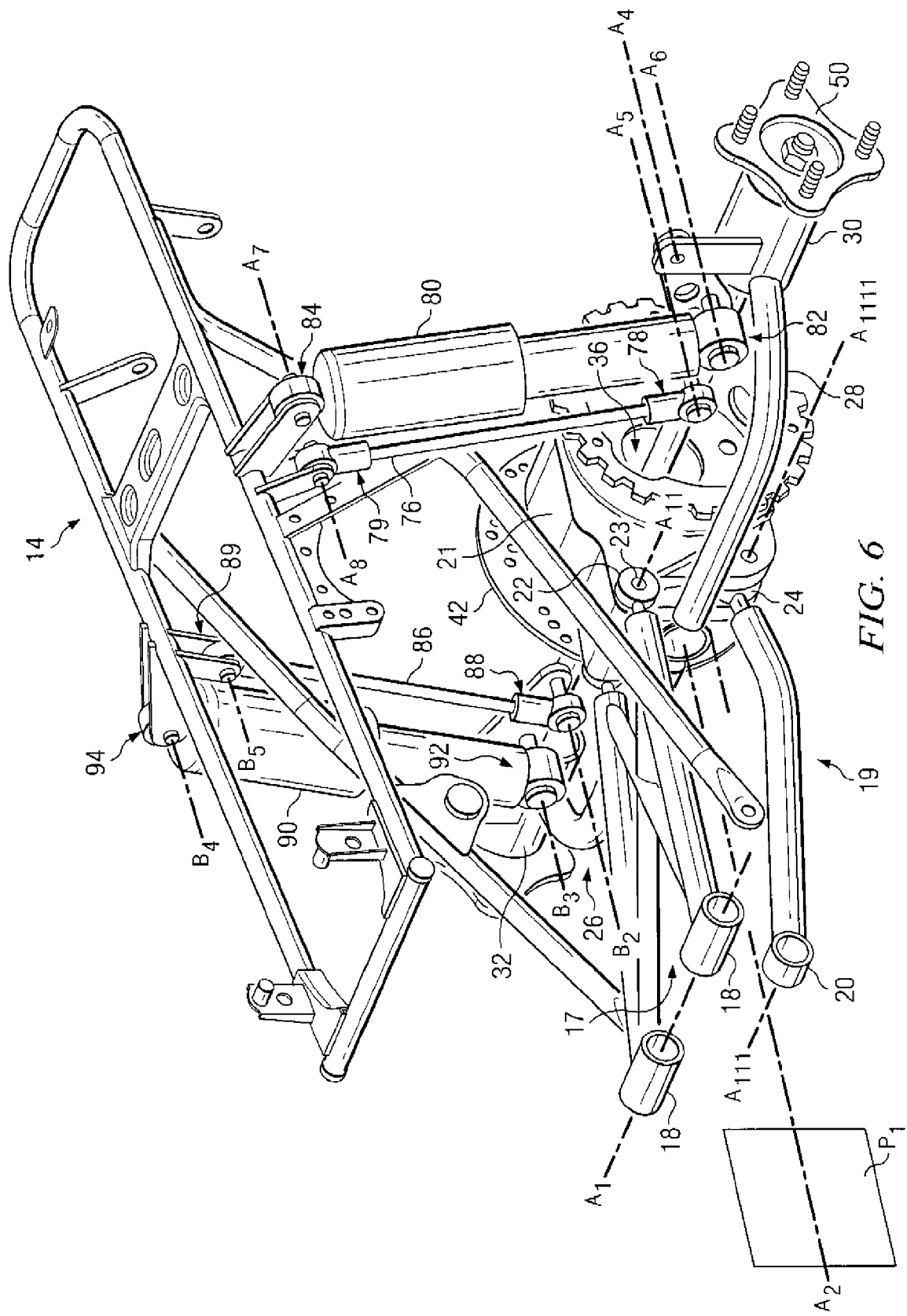
FIG. 6 is a top front perspective view depicting the components of FIG. 2.

The swing arm assembly 11 can comprise a swing member 16 as shown in FIG. 4. The swing member 16 can be configured for movable attachment to the frame 14 such that the swing member 16 is movable about one or more axes (e.g., $A_1$ and $A_{111}$ in FIG. 5) with respect to the frame 14. In one embodiment and as illustrated in FIGS. 4-6, the swing member 16 can comprise an upper swing member portion 17, a lower swing member portion 19, and a housing support portion 21. The upper swing member portion 17 can comprise upper front supports 18 and upper rear supports 22. In one embodiment, the upper front supports 18 can comprise annular portions. A pin (not shown) can be correspondingly provided through the frame 14 and the upper front supports 18 to facilitate movement of the upper swing member portion 17 on the pin and about the axis $A_1$. Similar to the upper front supports 18, in one embodiment, the upper rear supports 22 can also comprise annular portions, and another pin (e.g., 23 shown in FIG. 6) can be correspondingly provided through the housing support portion 21 and the upper rear supports 22 to facilitate movement of the upper swing member portion 17 about an axis $A_{11}$ with respect to the housing support portion 21.

In one embodiment and as further illustrated in FIGS. 4-6, the lower swing member portion 19 can comprise a lower front support 20 and a lower rear support 24. Similar to the upper front and rear supports 18 and 22 of the upper swing member portion 17, the lower front support 20 and lower rear support 24 can comprise annular portions. A pin (not shown) can be provided through the frame 14 and the lower front support 20 to facilitate movement of the lower swing member portion 19 about an axis $A_{11}$ with respect to the frame 14. Likewise another pin (also not shown) can be correspondingly provided through the housing support portion 21 and the lower rear support 24 to facilitate movement of the lower swing member portion 19 about an axis $A_{1111}$ with respect to housing support portion 21. It will be appreciated that the movable engagement of the upper and lower swing member portions 17, 19 to the frame 14 and the housing sup)port portion 21 facilitates vertical movement of the housing support portion 21 with respect to the frame 14. It will also be appreciated that supports of a swing member can cooperate with the frame in any variety of alternative mechanical movable engagements such as might involve one or more spherical joints, rubber bushings, heim joints, saddle joints, or the like.

It will also be appreciated that a swing member can be provided in any of a variety of other suitable configurations. For example, a swing member can comprise only a single (e.g., upper) swing member portion which is movably attached to a vehicle's frame. This single swing member portion can be integrally provided with or fixedly attached to a housing support portion. Such an arrangement might not include any other (e.g., lower) swing member portions for attaching a housing support portion to the vehicle's frame. As another example, a swing member might comprise more than two respective swing member portions.

Figure 3:
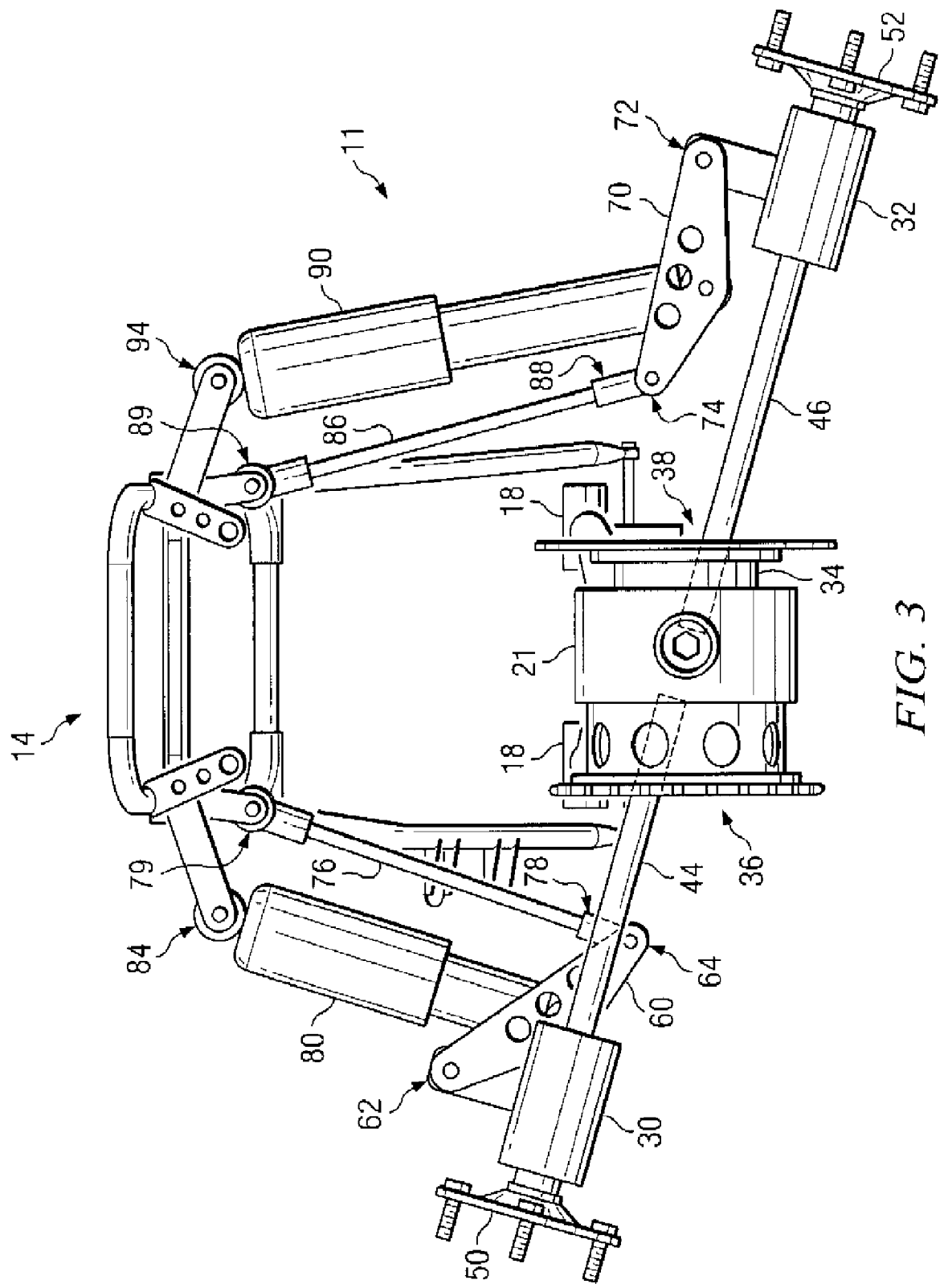
FIG. 3 is a rear elevational view depicting the components of FIG. 2 wherein the left and right axle portions are shown to be vertically articulated.

The housing support portion 21 is shown to rotatably support a housing 34. The housing 34 can include a left receptacle portion 36 and a right receptacle portion 38, as shown in FIGS. 3, 5 and 6. The housing 34 can be configured to rotate about an axis $A_3$ (shown in FIG. 5) with respect to the swing member 16, wherein the axis $A_3$ is shown to be substantially parallel with the axes $A_1$ and $A_{111}$. In one embodiment, the housing 34 can comprise a hollow enclosure having two ends which respectively define the left receptacle portion 36 and the right receptacle portion 38. The housing support portion 21 can define openings corresponding to the left receptacle portion 36 and the right receptacle portion 38 such that the housing support portion 21 can partially enclose a portion of the housing 34 between the left and right receptacle portions 36 and 38. At least one bearing (not shown) can be sandwiched between the housing 34 and the housing support portion 21 to rotatably support the housing 34 within the housing support portion 21 and to facilitate rotation of the housing 34 about the axis $A_3$. It will be appreciated that the housing 34 can be rotatably supported using any variety of alternative rotational arrangements such as frictional engagement using viscous fluid, magnetic levitation or the like.

The housing 34 can additionally comprise an outer drive surface configured to directly contact a drive member. In one embodiment and as illustrated in FIG. 5, for example, the outer drive surface can comprise a sprocket 40 configured to directly contact a flexible transmitter, such as a chain (48 in FIG. 1) or a belt (e.g., a cogged belt). The flexible transmitter can be coupled with a driveshaft of an engine such that rotational force from the driveshaft can be transmitted to the sprocket 40 to correspondingly rotate the housing 34. In another embodiment, the outer drive surface can comprise a pulley and the flexible transmitter can comprise a V-belt. In yet another embodiment, the outer drive surface can comprise a geared surface configured to contact a corresponding gear. In such an embodiment, the driveshaft can rotate the gear to engage and correspondingly rotate the housing. It will be appreciated that the outer drive surface can be provided in any of a variety of alternative suitable arrangements.

As shown in FIG. 5 for example, the housing 34 can further comprise a brake disc 42. The brake disc 42 can be frictionally engaged with a brake caliper (not shown in FIG. 5, but illustrated in the embodiment of FIGS. 10-12). To inhibit rotation of the housing 34, the caliper can push brake pads against the brake disc 42.

As illustrated in FIGS. 1-6, the sprocket 40 and the brake disc 42 can be disposed adjacent to the left receptacle portion 36 and the right receptacle portion 38, respectively. However, it will be appreciated that the sprocket 40 and the brake disc 42 can be provided in any of a variety of alternative locations and configurations. For example, for a vehicle having a drivetrain oriented on the right side of the vehicle, a sprocket can be provided adjacent to a right receptacle portion of a housing. Moreover, a sprocket and brake disc can be provided adjacent to the same receptacle portion of a housing. Furthermore, a portion of a housing disposed longitudinally between a left receptacle portion and a right receptacle portion can comprise an outer drive surface and/or a brake disc. In such a configuration, driving and/or braking forces can be applied near the middle of the housing, thereby even further reducing binding of the housing from application of drive forces away from the center of the housing.

A vehicle can include left and right axle portions provided in any of a variety of suitable configurations. For example, the swing arm assembly 11 can comprise a left axle portion 44 and a night axle portion 46. As illustrated in FIGS. 1-6, the left axle portion 44 can extend from the left receptacle portion 36 to rotatably engage a left wheel 51, and the right axle portion 46 can extend from the right receptacle portion 38 to rotatably engage a right wheel 53. The left axle portion 44 and right axle portion 46 can be continuously rotatably engaged with the housing 34 such that rotation of the housing 34 correspondingly rotates the left and right axle portions 44 and 46 irrespective of diversion of the left and light axle portions 44 and 46 from the axis $A_3$ during rotation of the housing 34. In one embodiment, the housing 34 can provide a homokinetic joint (i.e., constant-velocity joint) to rotate the left and right axle portions 44 and 46 at a variable angle to the axis of rotation $A_3$ of the housing 34. For example, the housing 34 can comprise internal splines which rotate within the housing support portion 21 along the axis $A_3$. The housing 34 can further comprise an inner hub operable to rotate at a variable angle to the axis of rotation $A_3$ of the housing 34. The inner hub can have outer splines that are correspondedly engaged with the inner splines of the housing 34 and can have inner splines that are correspondedly engaged with splines on the left and right axle portions 44 and 46 such that the left and right axle portions 44 and 46 can rotate at a variable angle to the axis of rotation $A_3$ of the housing 34. In another embodiment, a self-contained homokinetic joint (e.g., constant-velocity joint) can be affixed within the housing 34 and to the left and right axle portions 44 and 46 such that the left and right axle portions 44 and 46 can rotate at a variable angle to the axis of rotation $A_3$ of the housing 34. It will be appreciated that rotating the left and right axle portions 44 and 46 at a variable angle from the axis of rotation $A_3$ of the housing 34 can be achieved using any of a variety of alternative mechanical structures now known or hereafter developed such as a universal joint or a Thomson coupling.

Figure 2:
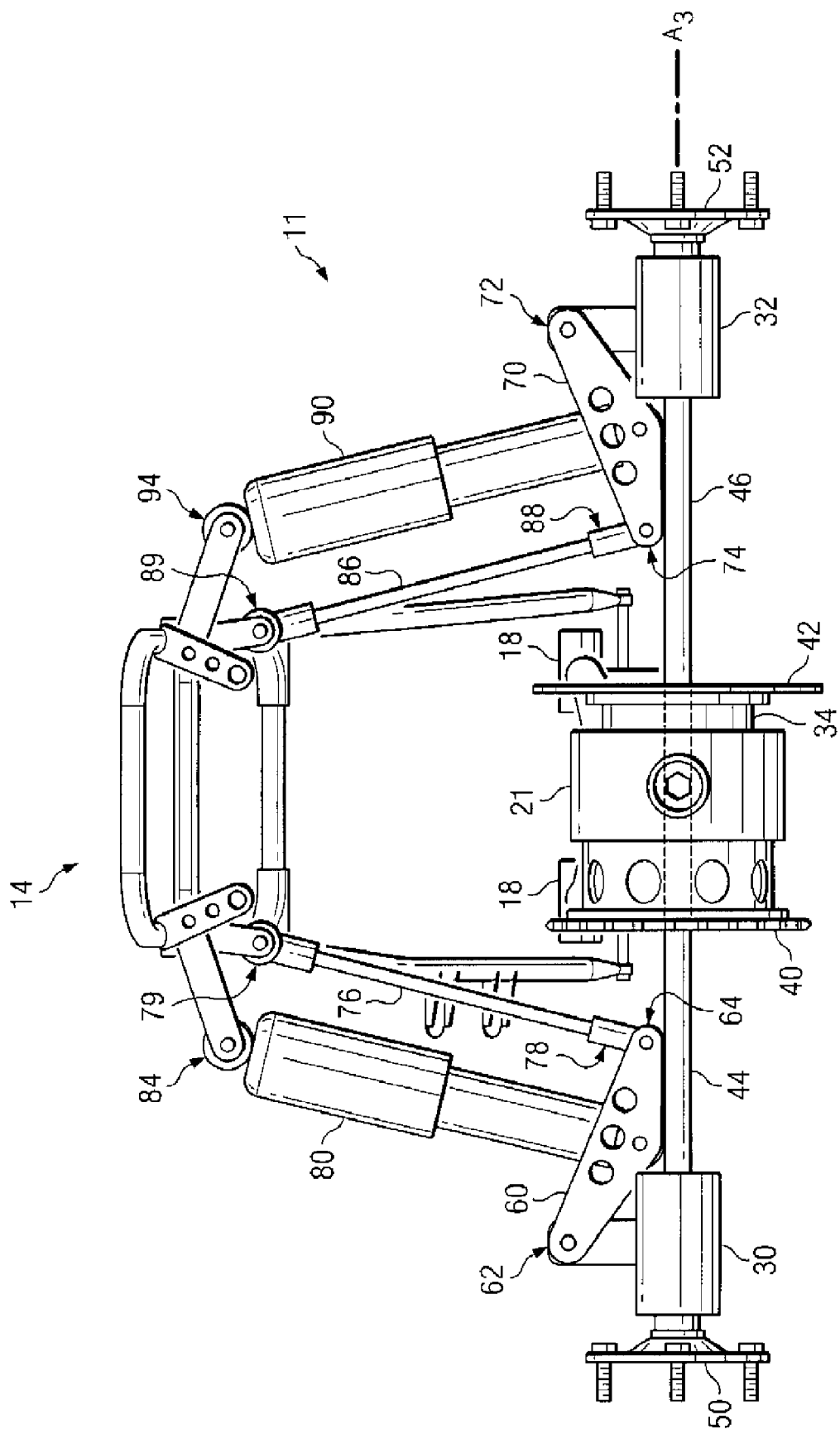
FIG. 2 is an enlarged rear elevational view depicting selected components of the ATV of FIG. 1.

In one embodiment and as illustrated in FIG. 2, the left axle portion 44 can be integral with the night axle portion 46 (e.g., formed as a single cylindrical member). In such an embodiment, the left axle portion 44 shares a common rotational axis with the right axle portion 46, and rotatable engagement with the housing 34 can be achieved using a single component (i.e., a single homokinetic joint) cooperatively engaged with both the left axle portion 44 and the right axle portion 46. In this embodiment, diversion of the left axle portion 44 from the axis $A_3$ would correspondingly divert the right axle portion 46 from the axis $A_3$ in an equal and opposite direction. In another embodiment and as illustrated in FIG. 3, the left axle portion 44 can be spaced from the right axle portion 46 (e.g., formed as two separate cylindrical members) which, it will be appreciated, can facilitate rotation of the left and right axle portions about a common rotational axis or different rotational axes with respect to one another. Similar to the previously described embodiment, rotatable engagement with the housing 34 can be achieved using one component (i.e., a single homokinetic joint) cooperatively engaged with both the left axle portion 44 and the right axle portion 46. However, rotatable engagement with the housing 34 can also be achieved using dedicated components for each of the left and right axle portions 44 and 46 (i.e., a homokinetic joint for each of the left and right axle portions 44 and 46).

During operation of the vehicle, an engine can actuate a drive member to rotate the housing 34 such as described above. Rotation of the housing 34 can correspondingly rotate the left axle portion 44 and the right axle portion 46, such that the right and left wheels 51 and 53 rotate to propel the ATV 10. As the ATV 10 travels, one side of the ATV 10 (i.e., right or left) can experience uneven terrain with respect to the other side of the ATV 10. In order to compensate for such terrain, the left and right axle portions 44 and 46 can articulate (i.e., roll) with respect to the housing 34 as illustrated in FIG. 3. Rotatable engagement between the housing 34 and the left and right axle portions 44 and 46 can be continuously maintained during articulation of the left and right axle portions 44 and 46, thereby facilitating continuous rotatable contact between the housing 34 and the left and right axle portions 44 and 46.

A vehicle can include one or more structures for rotationally supporting the left and right axle portions. For example, the swing arm assembly 11 can comprise a stabilizing assembly 26 as shown in FIGS. 4 and 6, for example. The stabilizing assembly 26 can comprise a central portion 28, a left hub support portion 30, and a right hub support portion 32. The central portion 28 can be movably attached to the swing member 16 such that the stabilizing assembly 26 is movable (e.g., pivotable) with respect to the swing member 16 about an axis $A_2$ (shown in FIGS. 4-6). In this embodiment, the left hub support portion 30 and the right hub support portion 32 are shown to be movable and, more particularly, pivotable, with respect to the swing member 16. As illustrated in FIG. 6, the axis $A_2$ can reside in an imaginary plane $P_1$ that is substantially perpendicular to the axis $A_1$. In one embodiment and as illustrated in FIGS. 4 and 6, the central portion 28 can comprise a tubular member which is movably attached to the housing support portion 21 of the swing member 16. In such an embodiment, the central portion 28 can comprise a pin member which projects into a bushing member defined or supported by the housing support portion 21. The bushing member can movably support the pin member through frictional engagement, thereby facilitating movement of the stabilizing assembly 26 about the axis $A_2$. In another embodiment, the pin member can project into a bearing member defined or supported by the housing support portion 21. In addition, other embodiments are contemplated which involve other movable attachments such as a spherical joint, a heim joint, or the like. Additionally, the central portion 28 can comprise any of a variety of other structures which span between the left hub support portion 30 and the right hub support portion 32 (e.g., a c-channel, L,-beam, I-beam, or T-beam). In still another embodiment, a vehicle can comprise left and right hub support portions provided by a single, elongated piece of tubing (e.g., sometimes referred to as an "axle tube") which substantially surrounds and supports the left and right axle portions.

In one embodiment, the right hub support portion 32 can be fixed with respect to the left hub support portion 30 as shown, for example, in FIGS. 1-6. For example, the left hub support portion 30 and the right hub support portion 32 can be attached to ends of the central portion 28. As illustrated in FIGS. 1-6, the left axle portion 44 can extend from the left receptacle portion 36 to the left hub support portion 30 such that the left hub support portion 30 rotatably supports the left axle portion 44. Additionally, the right axle portion 46 can extend from the right receptacle portion 38 to the night hub support portion 32 such that the right hub support portion 32 rotatably supports the right axle portion 46. In one embodiment and as illustrated in FIGS. 1-6, the left and right hub support portions 30 and 32 can comprise annular members. In such an embodiment, bearings can be provided within each of the left and right hub support portions 30 and 32 for contacting each of the respective corresponding left and right axle portions 44 and 46. However, it will be appreciated that the left and tight axle portions 44 and 46 can be rotatably supported using any of a variety of alternative mechanical strictures and in any of a variety of alternative rotational arrangements. It should also be understood that the central portion 28, the left hub support portion 30, and the right hub support portion 32 can be provided in any of a variety of alternative locations and configurations. In other embodiments, a stabilizing assembly and/or hub support portions might not be attached to a swing arm, but might be otherwise movably supported with respect to a frame of a vehicle.

As described above, the left and right axle portions 44 and 46 can articulate (i.e., roll) with respect to the housing 34 as one side of the ATV 10 (i.e., right or left) experiences uneven terrain. Accordingly, the stabilizing assembly 26 can move along the axis $A_2$ as the left and right axle portions 44 and 46 articulate. The forces applied to the left and right axle portions 44 and 46 as a result of the uneven terrain can consequently be distributed throughout the stabilizing assembly 26 to thereby minimize stress on the left and right axle portions 44 and 46. Furthermore, the stabilizing assembly 26 can be provided to maintain a desired orientation of the left axle portion 44 with respect to the right axle portion 46. In one embodiment, the left axle portion 44 and the right axle portion 46 can be secured by the stabilizing assembly 26 such that they are coaxially aligned with each other as shown in FIGS. 1-6. For example, as shown in FIGS. 2-3, the left and right axle portions 44, 46 can be respectively rotatably supported by the left and right hub support portions 30, 32 of the stabilizing assembly 26 such that the left and right axle portions 44, 46 share a common rotational axis regardless of the position of the stabilizing assembly 26 with respect to the frame 14. It will be appreciated that a stabilizing assembly can provide this function regardless of whether the left and right axle portions are spaced apart from one another (e.g., as shown in FIG. 3) or are integral with one another (as shown in FIG. 2). While a stabilizing assembly can be provided to support engine-driven wheels of a vehicle (e.g., see FIG. 1), it will be appreciated that a stabilizing assembly can alternatively be provided to support non-driven wheels of a vehicle.

The swing arm assembly 11 can further comprise a left hub 50 and a right hub 52, wherein the left hub 50 is affixed to the left axle portion 44 and the right hub 52 is affixed to the right axle portion 46. In one embodiment and as illustrated in FIG. 1, the left hub 50 and the right hub 52 can comprise lugs for securably affixing the left wheel 51 and the right wheel 53, respectively. In another embodiment, brake discs similar to brake disc 42 described above can be provided adjacent to the left and right hubs 50 and 52 to facilitate selective inhibition of wheel rotation.

The distribution of the weight of the ATV 10 between the left and right axle portions 44 and 46 can vary during turning of the ATV 10 (i.e., vehicle roll). To minimize the roll of the ATV 10, it will be appreciated that, in one alternative embodiment, respective ends of a sway bar member (not shown) can be attached to the left and right hub support portions 30, 32 to facilitate more even distribution of weight between the left and right axle portions 44 and 46. A middle portion of the sway bar member can be movably attached to the frame 14, the housing support portion 21, and/or another portion of the ATV 10 to further stabilize the sway bar member during roll of the ATV 10. It will be appreciated that such a sway bar member can be provided in any of a variety of suitable configurations or arrangements for minimizing vehicle roll.

In accordance with one embodiment, the swing arm assembly 11 can further comprise a support arm 60 and a cushion member 80 provided between the frame 14 and the stabilizing assembly 26 as shown, for example, in FIG. 5. As will be described in more detail below, the support arm 60 and the cushion member 80 can bias the stabilizing assembly 26 with respect to the frame 14 during articulation of the left and right axle portions 44 and 46 with respect to the frame 14.

The support arm 60 can extend between a first or outer end 62 and a second or inner end 64, and can have a generally triangular shape, as shown in FIGS. 2 and 3, for example. The outer end 62 is shown to comprise one of three vertices of the triangularly shaped support arm 60 and to be movably attached to the left hub support portion 30 of the stabilizing assembly 26 at an axis $A_4$ (shown in FIGS. 4-6). In another embodiment, such as when a ball joint or spherical joint facilitates attachment of the outer end 62 to the left hub support 30, such movement might not be limited to a single axis, but might instead involve a complex movement path involving multiple axes. The inner end 64 is shown to comprise another of three vertices of the triangularly shaped support arm 60 and to be movably attached to the frame 14 at an axis $A_5$ (shown in FIGS. 5-6). In another embodiment, such as when a ball joint or spherical joint facilitates attachment of the inner end 64 to the frame 14, such movement might not be limited to a single axis, but might instead involve a complex movement path involving multiple axes. Each of the axes $A_4$ and $A_5$ are shown in FIG. 6 to be substantially parallel with the axis $A_2$. However, in an alternative embodiment (e.g., see FIGS. 10-12), such axes might not be substantially parallel with a movement axis (e.g., similar to $A_2$ in FIG. 4) of a stabilizing assembly with respect to a swing member.

As illustrated in FIG. 6, a longitudinally extending riser member 76 can have a support end 78 movably attached to the inner end 64 of the support arm 60 at the axis $A_5$. The riser member 76 can also comprise a frame end 79 which is movably attached to the frame 14 at an axis $A_8$ or can alternatively be rigidly affixed to the frame 14. In another embodiment, such as when a ball joint or spherical joint facilitates movable attachment of the support end 78 or frame end 79 of the longitudinally extending riser member 76, such movement might not be limited to a single axis, but might instead involve a complex movement path involving multiple axes. In still another embodiment, the inner end 64 of the support arm 60 can be otherwise movably attached to the frame 14 and might even be indirectly attached to tie frame 14 by way of attachment to the swing member 16. It will be appreciated that a support arm can be movably attached to a stabilizing assembly and a frame in any of a variety of other suitable configurations such as might involve one or more spherical joints, rubber bushings, heim joints, saddle joints, or the like. It will likewise be appreciated that a longitudinally extending riser member can be movably attached to a support arm and a frame in any of a variety of configurations such as might involve one or more spherical joints, rubber bushings, heim joints, saddle joints, or the like.

The cushion member 80 is shown to extend between a first end 82 and a second end 84. The first end 82 of the cushion member 80 is shown to be movably attached to the remaining of three vertices of the triangularly shaped support arm 60 at an axis $A_6$ (shown in FIGS. 4-6). In another embodiment, such as when a ball joint or spherical joint facilitates attachment of the first end 82 of the cushion member 80 to the support arm 60, such movement might not be limited to a single axis, but might instead involve a complex movement path involving multiple axes. The second end 84 of the cushion member 80 can be movably attached to the frame 14 at an axis $A_7$ (shown in FIGS. 4-6). In another embodiment, such as when a ball joint or spherical joint facilitates attachment of the second end 84 of the cushion member 80 to the frame 14, such movement might not be limited to a single axis, but might instead involve a complex movement path involving multiple axes.

Each of the axes $A_6$ and $A_7$ are shown in FIG. 6 to be substantially parallel with the axis $A_2$. However, in an alternative embodiment (e.g., see FIGS. 10-12) such axes might not be substantially parallel with a movement axis (e.g., similar to $A_2$ in FIG. 4) of a stabilizing assembly with respect to a swings member. In one embodiment and as illustrated in FIGS. 1-6, the axis $A_6$ can be disposed about midway between the outer end 62 of the support arm 60 and the inner end 64 of the support arm 60. It will be appreciated, however, that the first end 82 of the cushion member 80 can be movably attached along any portion of the support arm 60 that lies between the axes $A_4$ and $A_5$, or at one of the other vertices (i.e., at the outer or inner end 62, 64) of the triangularly shaped support arm 60 (while the remaining two vertices are attached to the left hub support portion and the frame). Although the support arm 60 is shown in FIGS. 2-3 as being triangularly shaped, it will be appreciated that a support arm can be provided in any of a variety of other suitable configurations. For example, a support arm might be shaped as a square, a rectangle, a circle, an elongated rod, and/or otherwise (e.g., see the support arms 260 and 270 in FIGS. 10-12).

The second end 84 of the cushion member 80 can also be attached to the frame 14 in any of a variety of suitable manners and locations. For example, and as shown in FIGS. 1-6, the second end 84 of the cushion member 80 can be movably attached to the frame 14 adjacent to the attachment of the frame end 79 of the riser member 76 to the frame 14. In another example, the second end 84 of the cushion member 80 can be movably engaged with the frame 14 at the same location as the frame end 79 of the riser member 76 (e.g., axis $A_7$ or $A_8$ shown in FIGS. 4-6).

As the stabilizing assembly 26 moves about the axis $A_2$, such as during articulation of the left and right axle portions 44 and 46, the support arm 60 can correspondingly move (i.e., about the axis $A_4$) with respect to the stabilizing assembly 26. For example, in the embodiment of FIGS. 1-6, where the support arm, 60 is movably attached to the left hub support portion 30 and the left side of the frame 14, when the left axle portion 44 articulates upwardly with respect to the frame 14, as illustrated in FIG. 3, the support arm 60 moves about the axis $A_4$ in a clockwise direction. Consequently, and as further illustrated in FIG. 3, the cushion member 80 is shown to be compressed between the support arm 60 and the frame 14. Furthermore, when the left axle portion 44 articulates downwardly with respect to the frame 14, the support arm 60 moves about the axis $A_4$ in a counterclockwise direction and the cushion member 80 can become uncompressed.

The cushion member 80 can be configured to bias the support arm 60 with respect to the frame 14 and consequently bias the stabilizing assembly 26 with respect to the frame 14 about the axis $A_2$. In one embodiment and as illustrated in FIGS. 1-6, the cushion member 80 can comprise a shock absorber wherein the first end 82 and second end 84 comprise annular portions such as for engagement with pins to facilitate movement about the respective axes $A_6$ and $A_7$. As the left axle portion 44 articulates, the cushion member 80 resists this articulation. Such resistance can minimize shock to the vehicle from sudden articulation and can also maintain contact of the wheel 51 (see FIG. 1) with a traveled surface, thus dampening movement of the wheel 51. It will be appreciated that any of a variety of alternative mechanical structures (e.g., shocks, struts) can additionally or alternatively be provided for biasing the left axle portion 44, the support arm 60, and/or stabilizing assembly 26 with respect to the frame 14.

In one embodiment, as illustrated in FIGS. 1-6, a vehicle can comprise a support arm 60 and cushion member 80 provided on the left side of the vehicle and a corresponding second support arm 70 and second cushion member 90 provided on the right side of the vehicle which cooperate with the support arm 60 and the cushion member 80 to bias the stabilizing assembly 26 and the wheels 51, 53. In such an embodiment, the second support arm 70 can extend between a first or outer end 72 and a second or inner end 74. The outer end 72 can be movably attached to the right hub portion 32 of the stabilizing assembly 26 at an axis $B_1$ (shown in FIGS. 4-5). The inner end 74 can be movably attached to a second support end 88 of a second longitudinally extending riser member 86 of the frame 14 at an axis $B_2$ (shown in FIGS. 4-6). Each of the axes $B_1$ and $B_2$ are shown in FIG. 4 to be substantially parallel with the axis $A_2$. However, in an alternative embodiment (e.g., see FIGS. 10-12), such axes might not be substantially parallel with a movement axis (e.g., similar to $A_2$ in FIG. 4) of a stabilizing assembly with respect to a swing member.

Additionally, the second cushion member 90 can extend between a first end 92 and a second end 94. The first end 92 can be movably attached to the second support arm 70 at an axis $B_3$ (shown in FIGS. 4-6). The second end 94 can be movably attached to the frame 14 at an axis $B_4$ (shown in FIGS. 4 and 6). Each of the axes $B_3$ and $B_4$ are shown in FIG. 4 to be substantially parallel with the axis $A_2$. However, in an alternative embodiment (e.g., see FIGS. 10-12), such axes might not be substantially parallel with a movement axis (e.g., similar to $A_2$ in FIG. 4) of a stabilizing assembly with respect to a swing member. The second riser member 86 can also comprise a second frame end 89 which is movably attached to the frame 14 at an axis $B_5$ as illustrated in FIGS. 4 and 6, or can alternatively be rigidly affixed to the frame 14. As indicated above with respect to axes $A_4$, $A_5$, $A_6$, $A_7$, and $A_8$, when a ball joint or spherical joint is provided at the interfaces described above with respect to axes $B_1$, $B_2$, $B_3$, $B_4$, and $B_5$, movement might not be limited to a single axis, but might instead involve a complex movement path involving multiple axes. In alternative embodiments, the support arms and cushion members can be provided in any variety of alternative configurations and locations (e.g., at a front or rear of a vehicle).

The movable attachment of the cushion members 80, 90 to the support arms 60, 70 can facilitate an optimum effective spring rate. As is common, a cushion member performs ideally when the forces on such cushion member are applied parallel (i.e., unitary) with the length of the cushion member (e.g., from a first end to a second end). As illustrated in FIGS. 1, 2 and 4-6, the cushion members 80, 90 can be movably attached to the frame 14 and support arms 60, 70 such that initial vertical forces on the left and right axle portions 44 and 46 are not parallel with the length of the cushion members 80, 90 (e.g., from the second ends 84, 94 to the first ends 82, 92, respectively). However, in one embodiment, with reference to FIG. 3, as the left wheel. (51 in FIG. 1) and the left axle portion 44 are increasingly articulated toward the frame 14, the forces on the cushion member 80 move increasingly toward unitary. In this manner, it will be appreciated that an effective progressive spring rate can be achieved through use of a cushion member (e.g., 80) having a constant spring rate, provided that the cushion member is provided in an arrangement (e.g., see FIG. 3) in which compression of the cushion member moves toward unitary as the cushion member is increasing compressed. The effective spring rate can be progressive for both jounce and roll and can, for example, be more or less progressive in roll as compared to jounce.

Movable engagement of the cushion members 80, 90 with the support arms 60, 70 can also facilitate optimum uncompression characteristics of the cushion members 80, 90. In one embodiment and as illustrated in FIG. 3, as the right axle portion 46 articulates downwardly with respect to the frame 14, the cushion member 90 can uncompress. The movement of the support arm 70 can minimize the distance the cushion member 90 uncompresses to accommodate the downward articulation of the right axle portion 46. Readily available cushion members having minimal uncompression lengths can therefore be provided thereby reducing the cost and time involved in customizing cushion members.

It will be appreciated that use of support arms 60, 70 facilitates application of force from the cushion members 80, 90 to the stabilizing assembly 26 at locations further remote from a vehicle's roll center than would otherwise be possible if the cushion members were attached directly to the stabilizing assembly of the vehicle. In fact, through use of the support arms 60, 70, force can be transmitted from the cushion members 80, 90 to the stabilizing assembly 26 at locations that are near or actually within the central area defined by rims of wheels supported by the stabilizing assembly 26. By facilitating transmission of force to a stabilizing assembly at locations closer to the wheels and the outer ends of the stabilizing assembly (and axle portions) than clearance would otherwise allow for direct connection of cushion members to a stabilizing assembly, it will be appreciated that a vehicle's roll stiffness can be increased without increasing jounce stiffness. This higher roll stiffness can, in certain circumstances, eliminate any need for a sway bar member. It will be appreciated that elimination of a sway bar member can achieve a reduction in weight, cost, and bulk, and can facilitate more direct control of dampening through adjustment of the cushion members.

Figure 7:
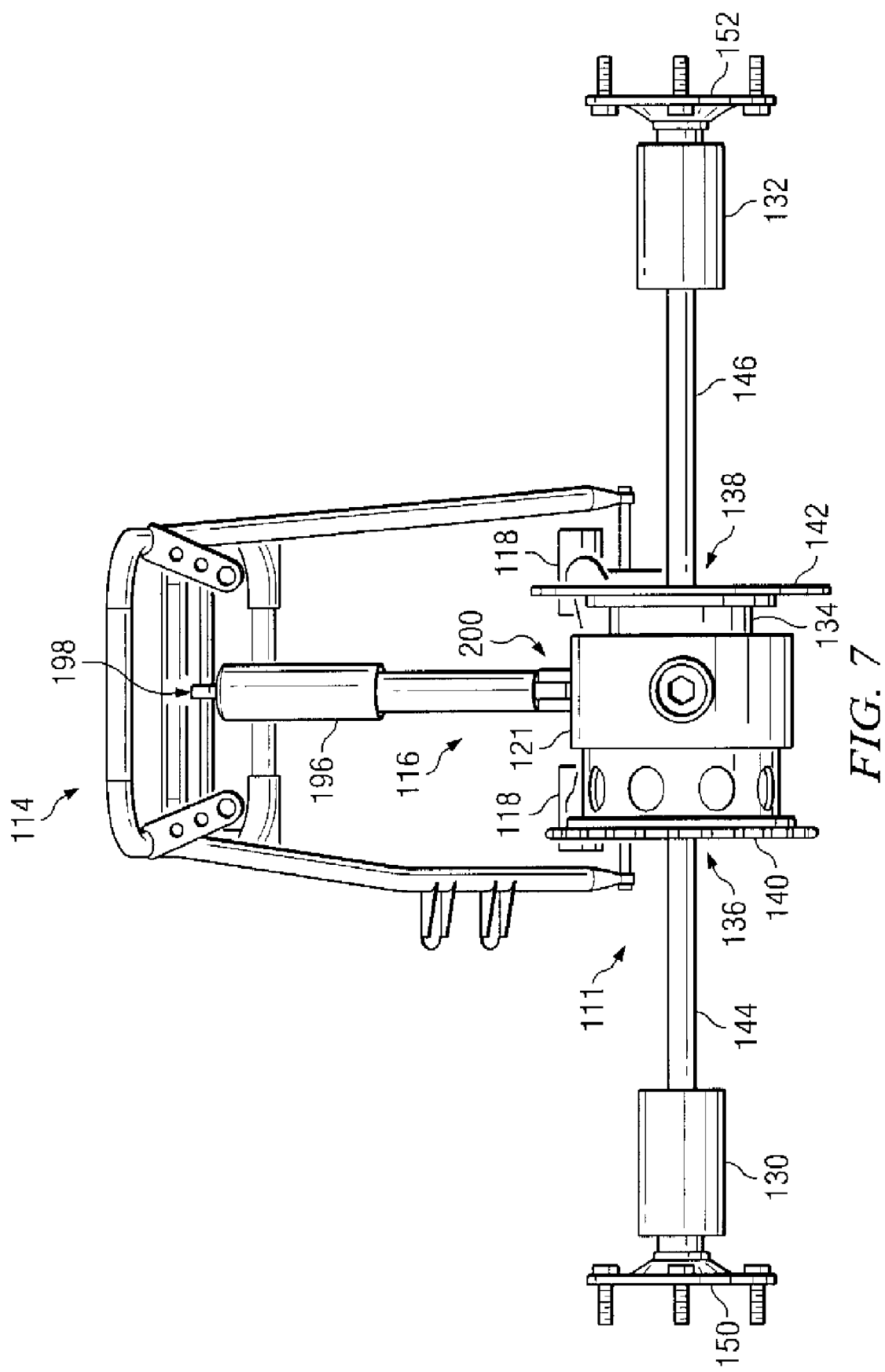
FIG. 7 is a rear elevational view depicting selected components of an ATV in accordance with another embodiment.
Figure 8:
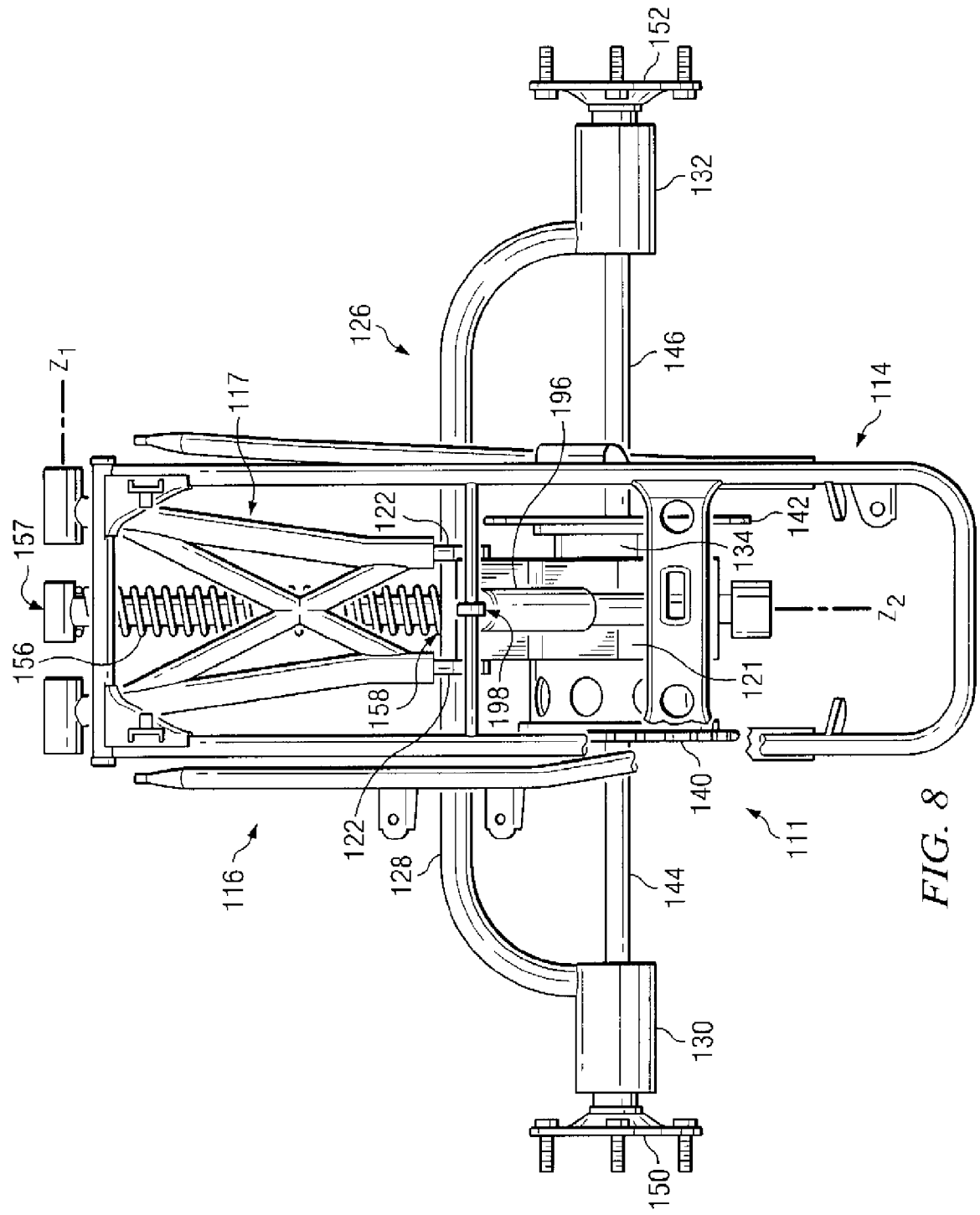
FIG. 8 is a top plan view depicting the components of FIG. 7.
Figure 9:
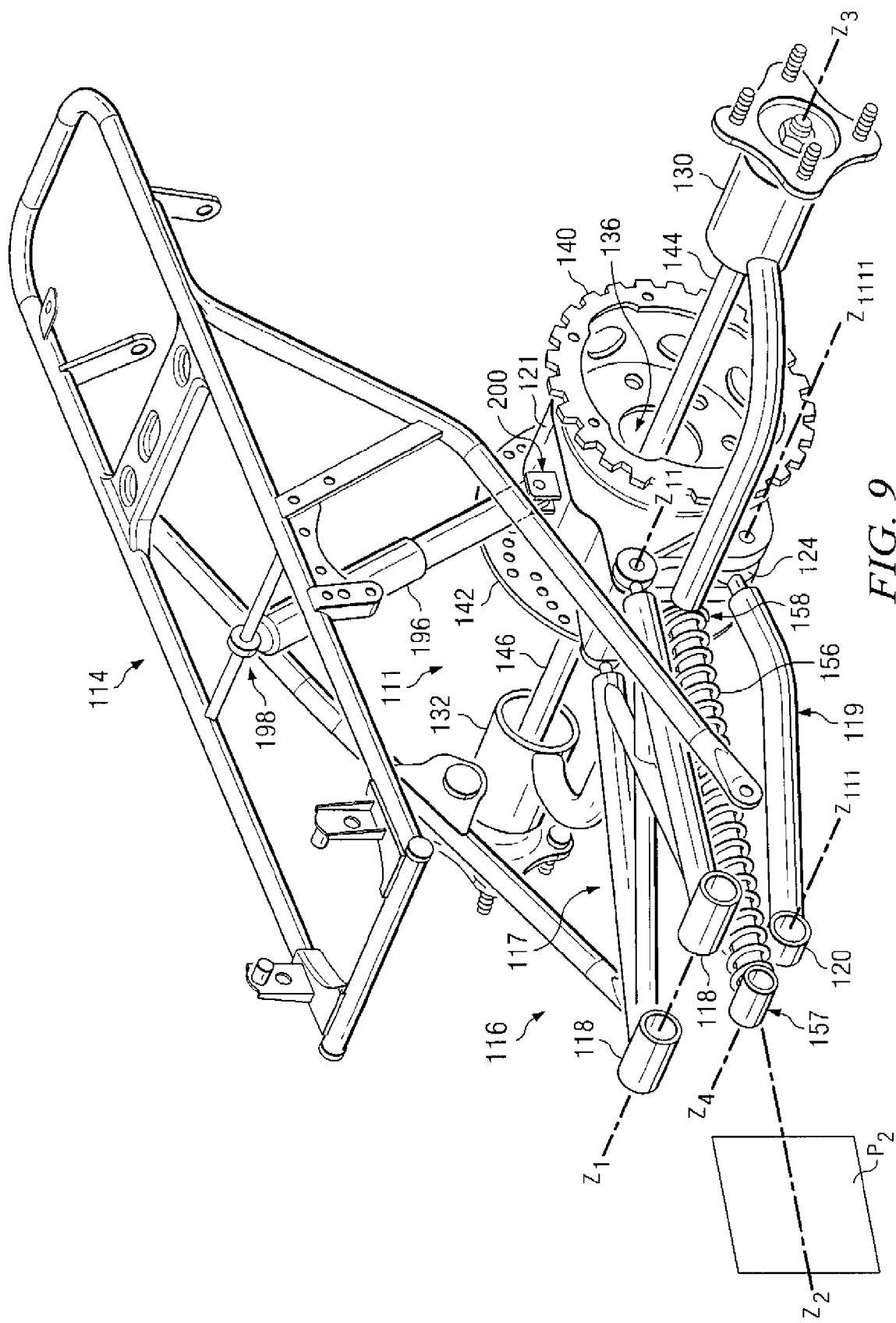
FIG. 9 is a top front perspective view depicting the components of FIG. 7.

A swing arm assembly 111 in accordance with another embodiment is depicted in FIGS. 7-9 and has many of the same features as described above with respect to the swing arm assembly 11 depicted in FIGS. 1-6. The swing arm assembly 111 is shown in FIG. 7 to comprise a swing member 116 which is configured for movable attachment to a vehicle's frame 114 such that the swing member 116 is movable about one or more axes (e.g., $Z_1$ and $Z_{111}$ in FIG. 9) with respect to the frame 114. In one embodiment and as illustrated in FIGS. 8 and 9, the swing member 116 can comprise an upper swing member portion 117, a lower swing member portion 119, and a housing support portion 121 which can be attached to facilitate movement about axes $Z_1$, $Z_{11}$, $Z_{111}$ and $Z_{1111}$ similar to the embodiment of FIGS. 1-6 described above.

Similar to the arrangement depicted in the embodiment of FIGS. 1-6 above, the housing support portion 121 is shown to support a housing 134 for rotation about an axis $Z_3$ (shown in FIG. 9 to be substantially parallel with the axes $Z_1$ and $Z_{111}$). The housing 134 can additionally comprise an outer drive surface (e.g., sprocket 140 shown in FIGS. 7-9) configured to directly contact a drive member, as described above. The housing 134 can further comprise a brake disc 142.

Similar to the left and right axle portions 44 and 46 in the embodiment of FIGS. 1-6 above, the swing arm assembly 111 can comprise a left axle portion 144 and a right axle portion 146 extending from a left receptacle portion 136 and a right receptacle portion 138 of the housing 134. Similar to that depicted in FIGS. 1-6, the swing awn assembly 111 is shown in FIGS. 7-9 to involve a stabilizing assembly 126 having a central portion 128, a left hub support portion 130, and a right hub support portion 132. The stabilizing assembly 126 can be movable with respect to the swing member 116 about an axis $Z_2$ (as shown in FIGS. 8 and 9). The axis $Z_2$ and can reside in an imaginary plane $P_2$ which is shown in FIG. 9 to be substantially perpendicular to the axis $Z_1$. The swing arm assembly 111 can additionally comprise a left hub 150 and a right hub 152, wherein the left hub 150 is affixed to the left axle portion 144 and the right hub 152 is affixed to the right axle portion 146.

In contrast to the embodiment of FIGS. 1-6, the swing arm assembly 111 is shown in FIGS. 7-9 to comprise a resilient member 156 and a cushion member 196. The resilient member 156 can be attached to the stabilizing assembly 126 and can be configured to radially bias the stabilizing assembly 126 with respect to the swing, member 116. Accordingly, the resilient member 156 can be provided to torsionally resist movement of the stabilizing assembly 126 (e.g., articulation of the left and right axle portions 144 and 1461). The resistance provided by resilient member 156 can increase proportionally with respect to the amount of articulation of the left and right axle portions 144 and 146 from the axis $Z_3$ (shown in FIG. 9) although it can be configured to provide some other measure of resistance as desired. The resilient member 156 can also be provided to maintain the left and right axle portions 144 and 146 in a resting position (see FIG. 7) (i.e., the position of the left and right axle portions when no vertical forces are applied such as from uneven terrain). In one embodiment and as illustrated in FIGS. 8 and 9, the resilient member 156 can comprise a torsion spring and can extend from a first end 157 to a second end 158. The first end 157 can be configured to movably engage the frame 114 and the second end 158 can be configured to engage the stabilizing assembly 126. In particular, the first end 157 can comprise an annular portion which is configured to move about an axis $Z_4$ shown in FIG. 9 to be substantially parallel with axes $Z_1$, $Z_{11}$, $Z_{111}$ and $Z_{1111}$. It will be appreciated that any of a variety of alternative mechanical structures (e.g., torsion bars, struts) can additionally or alternatively be provided for biasing the stabilizing assembly 126. It will additionally be appreciated that the resilient member 156 can be attached at any of a variety of alternative locations to bias the stabilizing assembly 126 accordingly.

During vehicle travel, one particular end of the vehicle (i.e., front or rear) can encounter terrain before the other end, (e.g., when a vehicle drives over a fallen tree). To improve vehicle performance, the swing member 116 can move (i.e., jounce) about axes $Z_1, Z_{11}, Z_{111}$ and $Z_{1111}$ with respect to the frame 114. The cushion member 196 can be attached to each of the swing member 116 and the frame 114 and can bias the swing member 116 about the axis $Z_1$ (shown in FIGS. 8 and 9) with respect to the frame 114. Accordingly, the cushion member 196 can be provided to resist movement of the swing member 116 about the axis $Z_1$. In one embodiment, the resistance provided by the cushion member 196 can increase proportionally with respect to the amount that the swing member 116 moves. In one embodiment and as illustrated in FIGS. 7-9, the cushion member 196 can comprise a shock absorber (e.g., similar to the cushion member 80 described above) having a first end 198 and a second end 200 movably attached to the frame 114 and housing support portion 121, respectively. The first end 198 and second end 200 can comprise respective annular portions engaged by respective pins to facilitate movement of the first end 198 and second end 200 about axes shown to be substantially parallel with axes $Z_1$, $Z_{11}, Z_{111}$ and $Z_{1111}$. It will be appreciated that any of a variety of alternative mechanical structures (e.g., shocks, struts) can additionally or alternatively be provided for biasing the swing member 116 with respect to the frame 114. Additionally, it will be appreciated that the cushion member 196 can be attached at any of a variety of alternative locations on the swing arm assembly 111 to bias the swing member 116. For example, instead of being attached to the housing support portion 121 as shown in FIG. 7, the second end 200 of the cushion member 196 can be attached to the upper swing member portion 117 and/or the lower swing member portion 119.

Figure 10:
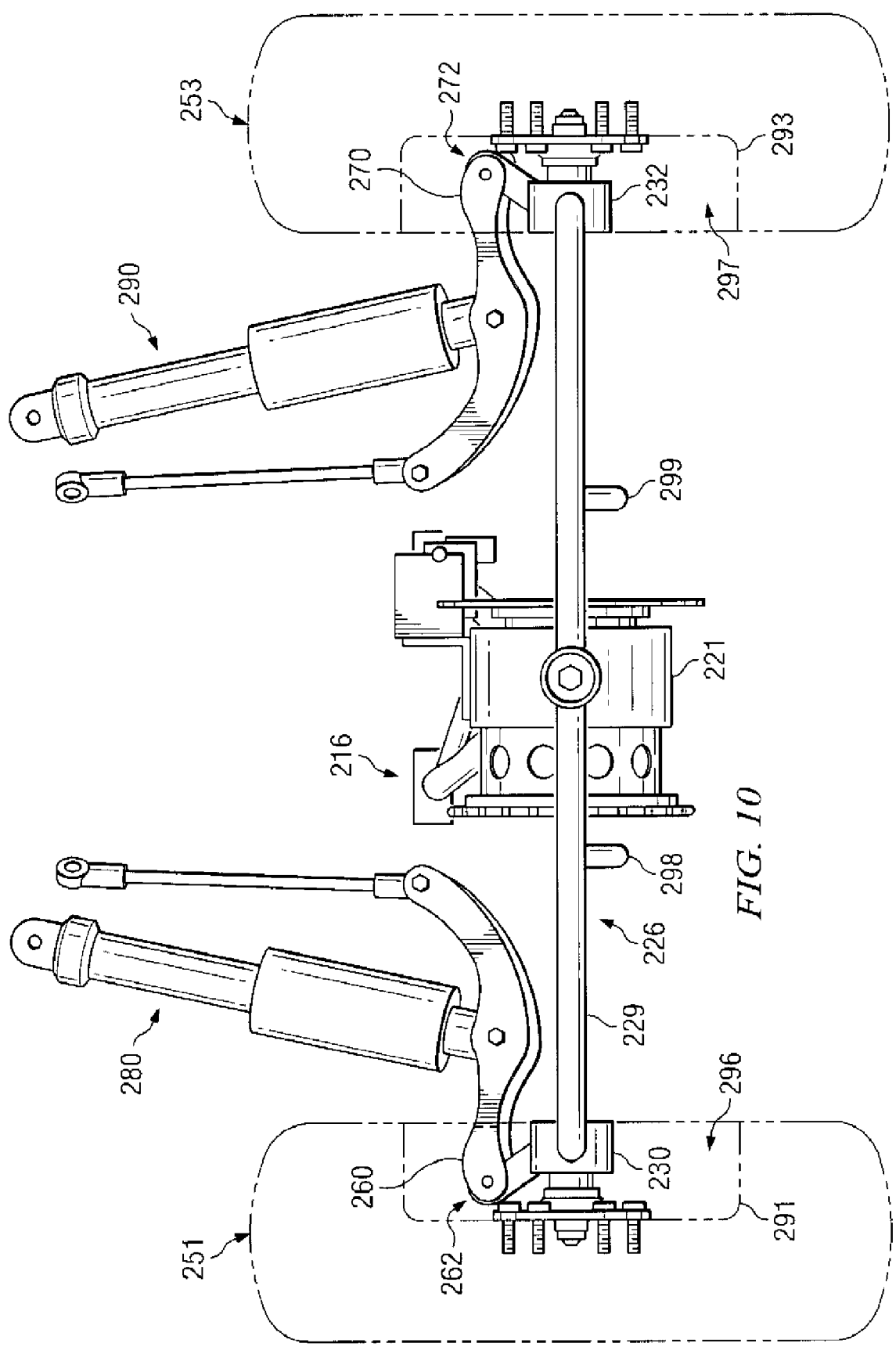
FIG. 10 is a rear elevational view depicting selected components of an ATV in accordance with yet another embodiment, wherein left and right wheels are shown in dashed lines.
Figure 11:
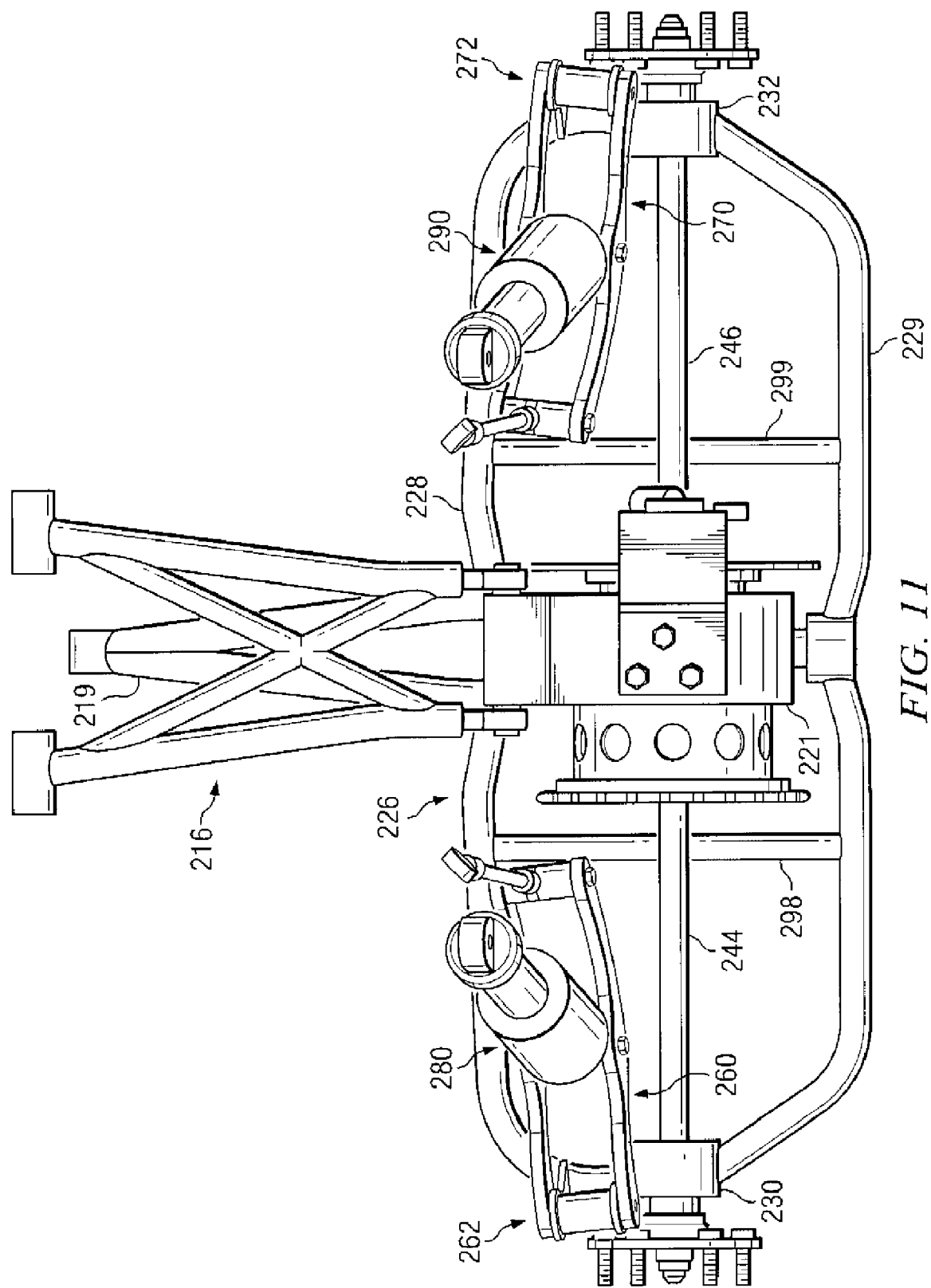
FIG. 11 is a top plan view depicting certain components of FIG. 10, wherein the left and right wheels have been removed for clarity of illustration.
Figure 12:
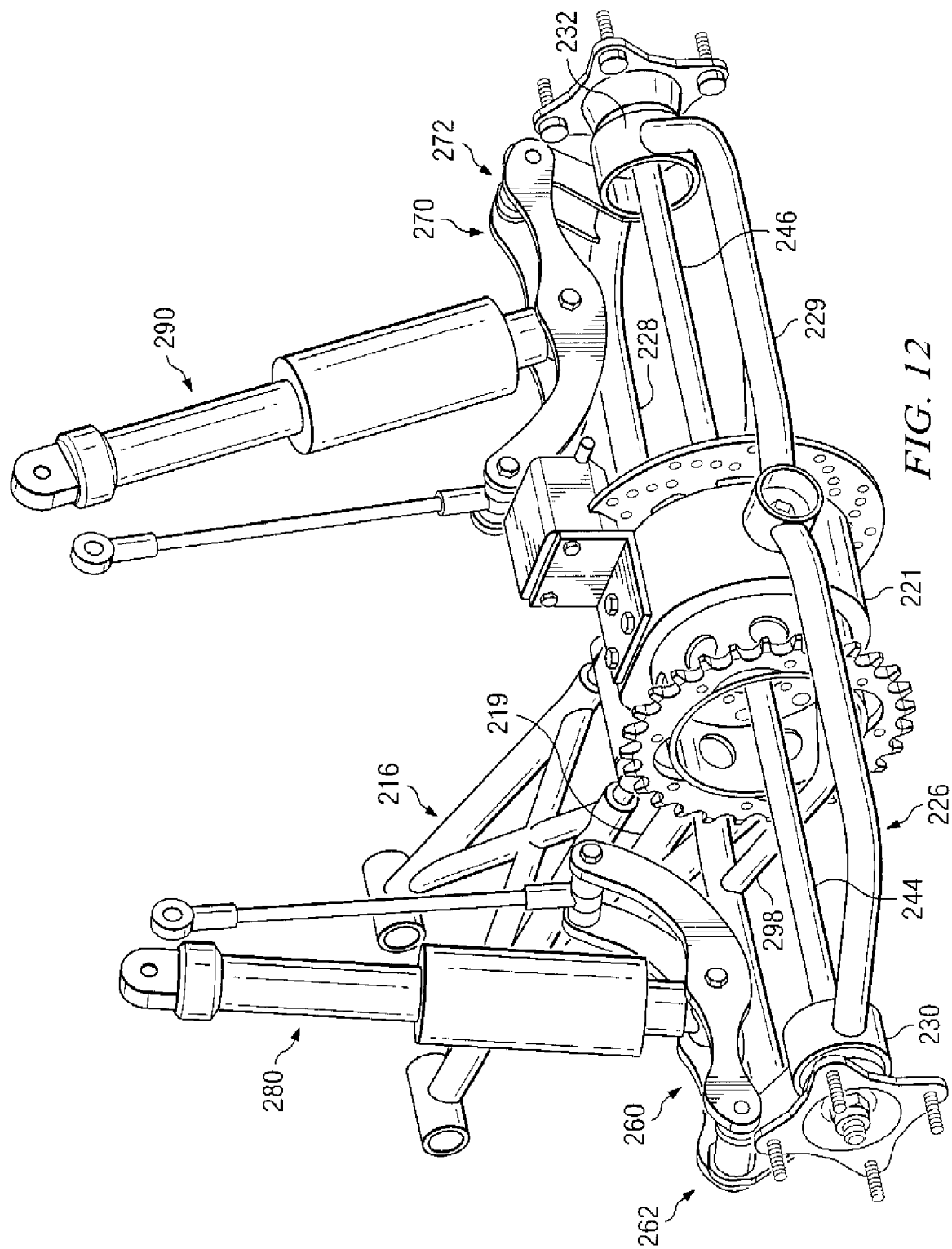
FIG. 12 is a top rear perspective view depicting the components of FIG. 11.

A vehicular suspension arrangement in accordance with another embodiment is depicted in FIGS. 10-12 to include many of the same features as described above with respect to the suspension arrangement of FIGS. 1-6. One difference between the embodiment of FIGS. 10-12 and the embodiment of FIGS. 1-6 involves the configuration of the lower swing member portion 219 of the swing member 216 including multiple tubular members (as opposed to a single tubular member as shown in the embodiment of FIGS. 1-6), as can be seen in FIGS. 10-12. Another difference between the embodiment of FIGS. 10-12 and the embodiment of FIGS. 1-6 involves the configuration of the stabilizing assembly 226 which is shown in FIGS. 11-12 to include multiple central portions 228, 229 (as opposed to a single such central portion 28 in the embodiment of FIGS. 1-6) which are each attached to a housing support portion 221 and respective left and right hub support portions 230, 232. The stabilizing assembly 226 of FIGS. 10-12 is also additionally shown to comprise left and right braces 298, 299 which attach the respective central portions 228, 229, and which can provide added strength and rigidity as compared to the arrangement of FIGS. 1-6.

Yet another difference between the embodiment of FIGS. 10-12 and the embodiment of FIGS. 1-6 involves the configuration of the support arms 260 and 270. In particular, each of the support arms 260, 270 is shown in FIGS. 10-12 to comprise two respective plates disposed upon opposite sides of an attached cushion remember 280, 290. In addition, as shown in FIGS. 10-12, each of the support arms 260, 270 is shown to be generally "J"-shaped or banana-shaped (as opposed to being triangularly-shaped as shown in FIGS. 1-6). Additionally, the support arms 260, 270 are shown to comprise respective outer ends 262, 272 which extend further laterally outwardly than those of the embodiment of FIGS. 1-6, and thus are movably attached to the respective left and right hub support portions 230, 232 at locations disposed further within respective central areas 296, 297 defined by respective wheel rims 291, 293 of respective left and right wheels 251, 253 attached to the respective left and right axle portions 244, 246 as illustrated in FIG. 10. This arrangement facilitates application of downward force from the respective cushion members 280, 290 as far laterally outwardly as possible from the center of the vehicle. Furthermore, unlike the embodiment of FIGS. 1-6, the support arms 260, 270 of FIGS. 10-12 are shown to be oriented such that their movement is not necessarily parallel or perpendicular with movement of certain other components of the suspension assembly. In still other embodiments (not shown), one or more support arms can be oriented to extend substantially perpendicularly to the manner in which the support arms 60, 70 of FIG. 4 extend (e.g., generally parallel with axis $A_4$, instead of generally parallel with axis $A_3$ as shown).

Figure 13:
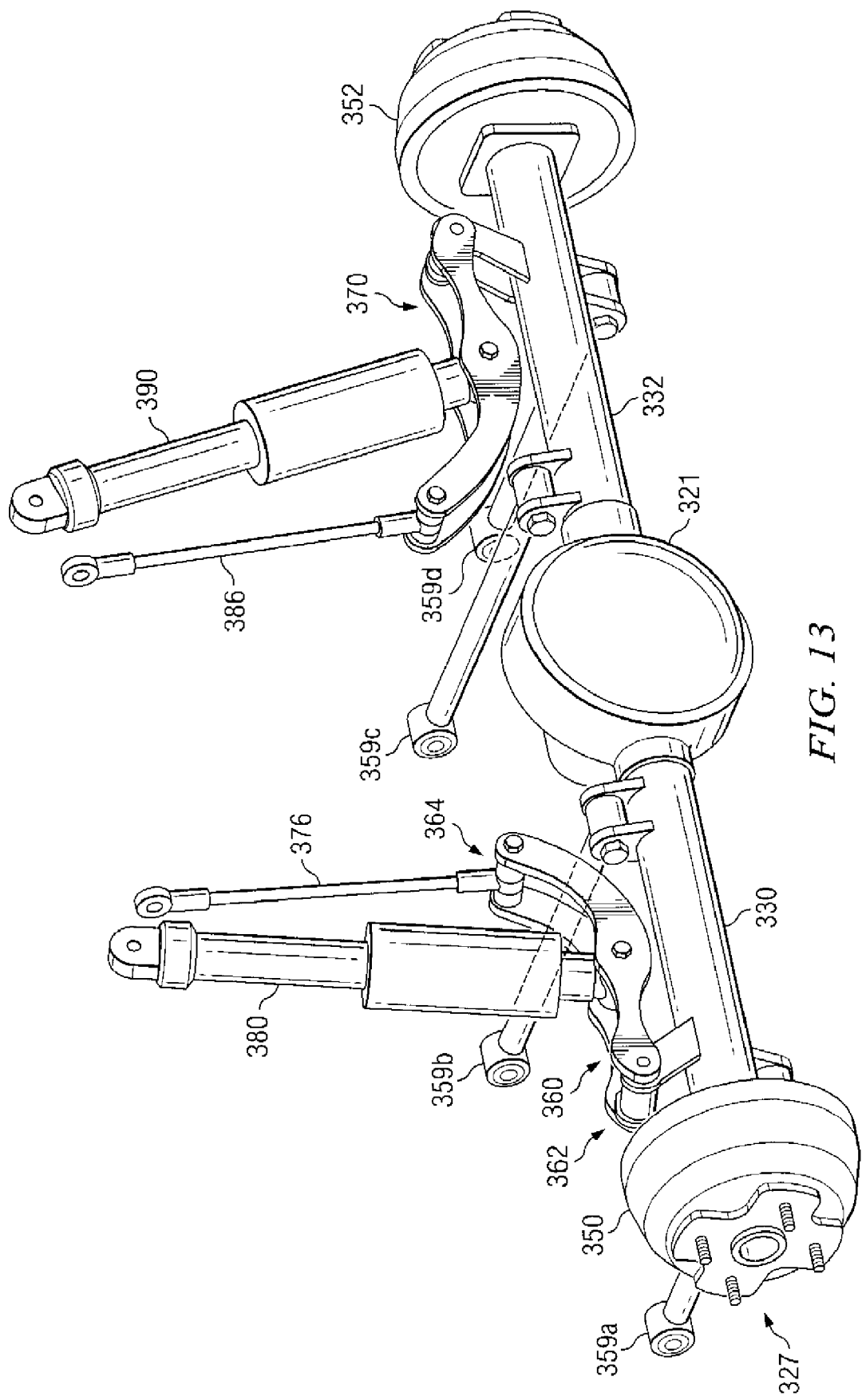
FIG. 13 is a rear perspective view depicting selected components of a vehicle in accordance with still another embodiment.

Another vehicular suspension arrangement is depicted in FIG. 13 to include certain of the same features as described above with respect to the suspension arrangement of FIGS. 1-6. In particular, an axle assembly 327 is shown to comprise left and right hub support portions 330, 332 which are shown to comprise axle tubes and which extend from a differential housing 321. It will be appreciated that left and right axle portions (not shown) can be disposed within and rotatably supported by the respective left and right hub support portions 330, 332. In the embodiment of FIG. 13, it will be appreciated that the left and right hub support portions 330, 332 can be fixed with respect to one another, and that the left and right axle portions can have a common rotational axis. Left and right hubs 350, 352 can be affixed to the respective left and right axle portions, and a brake disc or drum arrangement (not shown) can be associated with one or both of these left and right hubs 350, 352. In one embodiment, and as illustrated in FIG. 13, the left and right hubs 350, 352 can comprise lugs for securably affixing left and right wheels (not shown), respectively.

Four trailing arms 359a, 359b, 359c, and 359d are shown in FIG. 13 to be provided for movably attaching the axle assembly 327 to a frame of a vehicle. It will be appreciated that fewer than four (e.g., two or three), or greater than four, trailing arms can be provided to facilitate such movable attachment. A left support arm 360 is shown in FIG. 13 to extend between a left outer end 362 and a left inner end 364. The left outer end 362 is shown to be movably attached to the left hub support portion 330 at a location adjacent to the left hub 350. In this configuration, it will be appreciated that the left outer end 362 of the left support arm 360 can be movably attached to the left hub support portion 330 at a location disposed within a central area defined by a left wheel rim (not shown) attached to the left hub 350. The left inner end 364 is shown to be configured for movable attachment to a vehicle's frame such as by way of a left longitudinally extending riser member 376. A left cushion member 380 can be provided such that its first end is configured for movable attachment to a vehicle's frame, and such that its second end can be movably attached to the left support arm 360 at a position disposed along the left support arm 360 between the left outer end 362 and the left inner end 364, as shown in FIG. 13. A similar, mirrored arrangement is shown in FIG. 13 to be provided for a right support arm 370, a right longitudinally extending riser member 386, and a right cushion member 390.

Figure 14:
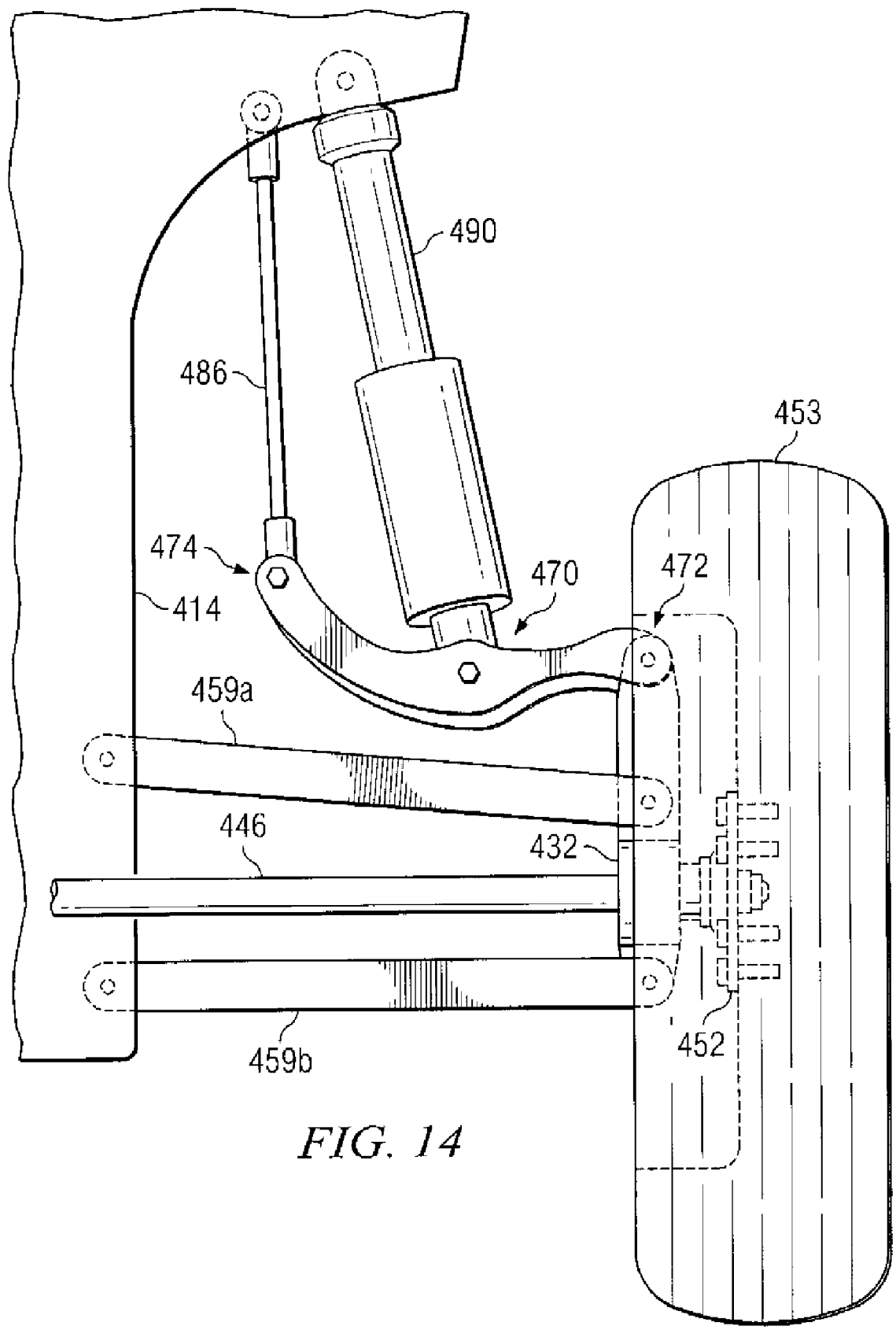
FIG. 14 is a rear elevational view depicting selected components of a vehicle in accordance with yet another embodiment.

Yet another vehicular suspension arrangement is depicted in FIG. 14 to also include certain of the same features as described above with respect to the suspension arrangement of FIGS. 1-6. In particular, FIG. 14 depicts a wheel 453 (e.g., a right rear wheel of a vehicle) suspended with respect to a frame 414 of the vehicle. A hub support portion 432 is shown to rotatably support an axle portion 446. A hub 452 can be affixed to the axle portion 446, and a brake disc or drum arrangement (not shown) can be associated with the hub 452. In one embodiment, and as illustrated in FIG. 14, the hub 452 can comprise lugs for securably affixing the wheel 453.

Upper and lower suspension arms (e.g., A-arms) 459a, 459b are shown in FIG. 14 to be provided for movably attaching the hub support portion 432 to the frame 414. It will be appreciated that fewer than two (e.g., one), or greater than two suspension arms can be provided to facilitate such movable attachment. A support arm 470 is shown in FIG. 14 to extend between an outer end 472 and an inner end 474. The outer end 472 is shown to be movably attached to the hub support portion 432 at a location adjacent to the hub 452. In this configuration, it will be appreciated that the outer end 472 of the support arm 470 can be movably attached to the hub supports portion 432 at a location disposed within a central area defined by a wheel rim of the wheel 453. The inner end 474 is shown to be configured for movable attachment to the frame 414 such as by way of a longitudinally extending riser member 486. A cushion member 490 can be provided such that its first end can be movably attached to the frame 414, and such that its second end can be movably attached to the support arm 470 at a position disposed along the support arm 470 between the outer end 472 and the left inner end 474, as shown in FIG. 14. A similar, mirrored arrangement of an axle portion, a hub, a wheel, suspension arms, a hub support portion, a support arm, a longitudinally extending riser member, and a cushion member can be provided for a corresponding wheel (e.g., a left wheel) suspended from an opposite side (e.g., a left side) of the frame 414.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicular swing arm assembly comprising:
   a swing member configured for movable attachment to a frame of a vehicle such that the swing member is movable about a first axis with respect to a frame of a vehicle;
   a stabilizing assembly comprising a central portion, a left hub support portion, and a right hub support portion;
   a housing comprising a left receptacle portion, a right receptacle portion, and an outer drive surface, wherein the housing is rotatably supported by the swing member and is configured to rotate about a third axis with respect to the swing member, the third axis is substantially parallel with the first axis, and the outer drive surface is configured to directly contact a drive member;
   a left axle portion extending from the left receptacle portion to the left hub support portion; and
   a right axle portion extending from the right receptacle portion to the right hub support portion, wherein the central portion is pivotally attached to the housing such that the stabilizing assembly is pivotable about a second axis with respect to the housing, and wherein the second axis resides in a plane substantially perpendicular to the first axis.

2. The vehicular swing arm assembly of claim 1 wherein the outer drive surface comprises a sprocket configured to directly contact a chain.

3. The vehicular swing arm assembly of claim 1 wherein the left hub support portion rotatably supports the left axle portion and the right hub support portion rotatably supports the right axle portion.

4. A vehicular swing arm assembly comprising:
   a swing member configured for movable attachment to a frame of a vehicle such that the swing member is movable about a first axis with respect to a frame of a vehicle;
   a stabilizing assembly comprising a central portion, a left hub support portion, and a right hub support portion, wherein the central portion is movably attached to the swing member such that the stabilizing assembly is movable about a second axis with respect to the swing member, and wherein the second axis resides in a plane substantially perpendicular to the first axis;
   a housing comprising left receptacle portion, a right receptacle portion, and an outer drive surface, wherein the housing is rotatably supported by the swing member and is configured to rotate about a third axis with respect to the swing member, the third axis is substantially parallel with the first axis, and the outer drive surface is configured to directly contact a drive member;
   a left axle portion extending from the left receptacle portion to the left hub support portion;
   a right axle portion extending from the right receptacle portion to the right hub support portion;
   a left support arm; and
   a right support arm, wherein the left support arm extends between a left outer end and a left inner end, the left outer end is movably attached to the left hub support portion, the right support arm extends between a right outer end and a right inner end, the right outer end is movably attached to the right hub support portion, each of the left inner end and the right inner end is configured for movable attachment to a frame, the left support arm is configured for movable attachment to a left cushion member at a position disposed along the left support arm between the left outer end and the left inner end, and the right support arm is configured for movable attachment to a right cushion member at a position disposed along the right support arm between the right outer end and the right inner end.

5. A vehicle comprising:
   a frame;
   a swing member movably attached to the frame such that the swing member is movable about a first axis with respect to the frame;
   a stabilizing assembly comprising a central portion, a left hub support portion, and a right huh support portion;
   a housing comprising a left receptacle portion, a right receptacle portion, and an outer drive surface;
   a drive member directly contacting the outer drive surface, wherein the housing is rotatably supported by the swing member;
   a left axle portion extending from the left receptacle portion to the left hub support portion; and
   a right axle portion extending from the right receptacle portion to the right hub support portion, wherein the central portion is pivotally attached to the housing such that the stabilizing assembly is pivotable about a second axis with respect to the housing, and wherein the second axis resides in a plane substantially perpendicular to the first axis.

6. The vehicle of claim 5 wherein the outer drive surface comprises a sprocket.

7. The vehicle of claim 6 wherein the drive member comprises a flexible transmitter engaged with the sprocket.

8. The vehicle of claim 7 wherein the flexible transmitter comprises a chain.

9. A vehicle comprising:
a frame;
a swing member movably attached to the frame such that the swing member is movable about a first axis with respect to the frame;
a stabilizing assembly comprising a central portion, a left hub support portion, and a right hub support portion, wherein the central portion is movably attached to the swing member such that the stabilizing assembly is movable about a second axis with respect to the swing member, and wherein the second axis resides in a plane substantially perpendicular to the first axis;
a housing comprising a left receptacle portion, a right receptacle portion, and an outer drive surface;
a drive member directly contacting the outer drive surface, wherein the housing is rotatably supported by the swingm member;
a left axle portion extending from the left receptacle portion to the left hub support portion;
a right axle portion extending from the right receptacle portion to the right hub support portion;
a left support arm;
a right support arm;
a left cushion member; and
a right cushion member, wherein the left support arm extends between a left outer end and a left inner end, the left outer end is movably attached to the left hub support portion, the right support arm extends between a right outer end and a right inner end, the right outer end is movably attached to the right hub support portion, each of the left inner end and the right inner end is movably attached to the frame, the left cushion member comprises a left first end and a left second end, the left first end is movably attached to the frame, the left second end is movably attached to the left support arm at a position disposed along the left support arm between the left outer end and the left inner end, the right cushion member comprises a right first end and a right second end, the right first end is movably attached to the frame, and the right second end is movably attached to the right support arm at a position disposed along the right support arm between the right outer end and the right inner end.

10. A vehicle comprising:
a frame;
a left hub support portion;
a right hub support portion fixed with respect to the left hub support portion;
a left axle portion being rotatably supported by the left hub support portion;
a right axle portion being rotatably supported by the right hub support portion;
a left wheel attached to the left axle portion;
a right wheel attached to the right axle portion;
a left support arm extending between a left outer end and a left inner end, wherein the left outer end is movably attached to the left hub support portion, and wherein the left inner end is movably attached to the frame;
a right support arm extending between a right outer end and a right inner end, wherein the right outer end is movably attached to the right hub support portion, and the right inner end is movably attached to the frame;
a left cushion member comprising a left first end and a left second end, the left first end being movably attached to the frame, and the left second end being movably attached to the left support arm at a position disposed along the left support arm between the left outer end and the left inner end; and
a right cushion member comprising a right first end and a right second end, the right first end being movably attached to the frame, and the right second end being movably attached to the right support arm at a position disposed along the right support arm between the right outer end and the right inner end.

11. The vehicle of claim 10 wherein the left second end of the left cushion member is movably attached to the left support arm at a position disposed about midway between the left outer end and the left inner end of the left support arm, and wherein the right second end of the right cushion member is movably attached to the right support arm at a position disposed about midway between the right outer end and the right inner end of the right support arm.

12. The vehicle of claim 10 wherein the left axle portion shares a common rotational axis with the right axle portion.

13. The vehicle of claim 10 wherein the left wheel comprises a left wheel rim, the right wheel comprises a right wheel rim, the left outer end of the left support arm is movably attached to the left hub support portion at a location disposed within a central area defined by the left wheel rim, and the right outer end of the right support arm is movably attached to the right hub support portion at a location disposed within a central area defined by the right wheel rim.

14. The vehicle of claim 10 further comprising a left longitudinally extending riser member and a right longitudinally extending riser member, wherein the left longitudinally extending riser member extends between a left frame end and a left support end, the left frame end is attached to the frame, the left support end is movably attached to the left inner end of the left support member, the right longitudinally extending riser member extends between a right frame end and a right support end, the right frame end is attached to the frame, and the right support end is movably attached to the right inner end of the right support member.

15. The vehicle of claim 14 wherein the left frame end of the left longitudinally extending riser member is movably attached to the frame, and wherein the right frame end of the right longitudinally extending riser member is movably attached to the frame.

16. The vehicle of claim 10 further comprising a swing member movably attached to the frame, wherein the left hub support portion and the right hub support portion are pivotable with respect to the swing member.

17. The vehicle of claim 10 comprising an all terrain vehicle.

18. The vehicle of claim 10 wherein the left axle portion is spaced from the right axle portion.

19. The vehicle of claim 10 wherein the left axle portion is integral with the right axle portion.

20. A vehicle comprising:
a frame;
a left hub support portion;
a right hub support portion;
a left axle portion being rotatably supported by the left hub support portion;

a right axle portion being rotatably supported by the right hub support portion;

a left wheel attached to the left axle portion;

a right wheel attached to the right axle portion;

a left longitudinally extending riser member extending between a left frame end and a left support end, wherein the left frame end is movably attached to the frame;

a right longitudinally extending riser member extending between a right frame end and a right support end, wherein the right frame end is movably attached to the frame;

a left support arm extending between a left outer end and a left inner end, wherein the left outer end is movably attached to the left hub support portion, and wherein the left inner end is movably attached to the left support end of the left longitudinally extending riser member;

a right support arm extending between a right outer end and a right inner end, wherein the right outer end is movably attached to the right hub support portion, and wherein the right inner end is movably attached to the right support end of the right longitudinally extending riser member;

a left cushion member comprising a left first end and a left second end, the left first end being movably attached to the frame, and the left second end being movably attached to the left support arm at a position disposed along the left support arm between the left outer end and the left inner end; and a right cushion member comprising a right first end and a right second end, the right first end being movably attached to the frame, and the right second end being movably attached to the right support arm at a position disposed along the right support arm between the right outer end and the right inner end.

21. The vehicle of claim 20 wherein the left second end of the left cushion member is movably attached to the left support arm at a position disposed about midway between the left outer end and the left inner end of the left support arm, and wherein the right second end of the right cushion member is movably attached to the right support arm at a position disposed about midway between the right outer end and the right inner end of the right support arm.

22. The vehicle claim 20 wherein the left wheel comprises a left wheel rim, the right wheel comprises a right wheel rim, the left outer end of the left support arm is movably attached to the left hub support portion at a location disposed within a central area defined by the left wheel rim, and the right outer end of the right support arm is movably attached to the right hub support portion at a location disposed within a central area defined by the right wheel rim.

* * * * *

UNITED STATES PATENT AND TRADEMARK OFFICE
CERTIFICATE OF CORRECTION

| | | |
|---|---|---|
| PATENT NO. | : 7,967,309 B2 | Page 1 of 1 |
| APPLICATION NO. | : 12/039261 | |
| DATED | : June 28, 2011 | |
| INVENTOR(S) | : Daniel Thomas Sellars et al. | |

It is certified that error appears in the above-identified patent and that said Letters Patent is hereby corrected as shown below:

Column 1, line 41, change "night" to -- right --;
Column 3, line 40, change "am" to -- an --;
Column 4, line 16, change "sup)port" to -- support --;
Column 5, line 34, change "night" to -- right --;
Column 5, line 42, change "light" to -- right --;
Column 6, line 2, change "night" to -- right --;
Column 7, lines 5-6, change "sup port" to -- support --;
Column 7, line 22, change "night" to -- right --;
Column 7, line 31, change "tight" to -- right --;
Column 7, lines 32-33, change "strictures" to -- structures --;
Column 9, line 35, change ")" to -- ), --;
Column 9, line 38, change "swings" to -- swing --;
Column 10, line 2, change "arm," to -- arm --;
Column 12, line 25, change "awn" to -- arm --;
Column 12, line 43, change "swing," to -- swing --;
Column 12, line 46, change "1461" to -- 146 --;
Column 13, line 64, change "remember" to -- member --;
Column 15, line 21, change "supports" to -- support --;
Claim 5, column 16, line 56, change "huh" to -- hub --;
Claim 9, column 17, line 27, change "swingm" to -- swing --;
Claim 16, column 18, lines 54-55, change "pivotablc" to -- pivotable --; and
Claim 22, column 20, line 18, change "vehicle claim" to -- vehicle of claim --.

Signed and Sealed this
Ninth Day of August, 2011

David J. Kappos
*Director of the United States Patent and Trademark Office*